US011706519B2

United States Patent
Kim et al.

(10) Patent No.: US 11,706,519 B2
(45) Date of Patent: *Jul. 18, 2023

(54) CAMERA MODULE AND OPTICAL DEVICE COMPRISING SAME

(71) Applicant: LG INNOTEK CO., LTD., Seoul (KR)

(72) Inventors: Min Soo Kim, Seoul (KR); In Hoe Kim, Seoul (KR); Hyun Ah Oh, Seoul (KR); Sung Il Lee, Seoul (KR); Jong Ho Chung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,680

(22) Filed: Jul. 14, 2022

(65) Prior Publication Data
US 2022/0353396 A1 Nov. 3, 2022

Related U.S. Application Data

(63) Continuation of application No. 16/982,504, filed as application No. PCT/KR2019/003108 on Mar. 18, 2019, now Pat. No. 11,418,687.

(30) Foreign Application Priority Data

Mar. 20, 2018 (KR) .......................... 10-2018-0031895

(51) Int. Cl.
*H04N 23/57* (2023.01)
*H04N 23/54* (2023.01)
(Continued)

(52) U.S. Cl.
CPC .............. *H04N 23/57* (2023.01); *G02B 7/09* (2013.01); *G02B 27/646* (2013.01); *G03B 5/00* (2013.01);
(Continued)

(58) Field of Classification Search
CPC .............. H04N 5/2257; H04N 5/2253; H04N 5/23287; H04N 23/57; H04N 23/54;
(Continued)

(56) References Cited

U.S. PATENT DOCUMENTS 6,784,534 B1 * 8/2004 Glenn ................. H01L 31/0203
257/E31.117
7,046,296 B2 * 5/2006 Shinomiya ........ H01L 27/14625
348/340
(Continued)

FOREIGN PATENT DOCUMENTS

CN        100576555 C      12/2009
CN        104749858 A       7/2015
(Continued)

OTHER PUBLICATIONS

European search report issued in European Application No. 19 77 1520, dated Nov. 5, 2021.

*Primary Examiner* — Shahbaz Nazrul
(74) *Attorney, Agent, or Firm* — Birch, Stewart, Kolasch & Birch, LLP

(57) ABSTRACT

A camera includes a lens barrel, a holder, a filter disposed in the holder, a circuit board having an aperture, a reinforcing member including a first region corresponding to the aperture and a second region in which the circuit board is disposed, and an image sensor disposed in the first region of the reinforcing member. The first region of the reinforcing member includes a protruding part protruding farther than the second region of the reinforcing member. The image sensor is disposed on the upper surface of the protruding part.

20 Claims, 14 Drawing Sheets

(51) Int. Cl.
*H04N 23/68* (2023.01)
*G02B 7/09* (2021.01)
*G02B 27/64* (2006.01)
*G03B 5/00* (2021.01)
*G03B 13/36* (2021.01)

(52) U.S. Cl.
CPC ............. *G03B 13/36* (2013.01); *H04N 23/54* (2023.01); *H04N 23/687* (2023.01); *G03B 2205/0007* (2013.01)

(58) Field of Classification Search
CPC ...... H04N 23/687; H04N 23/55; H04N 23/68; G02B 7/09; G02B 27/646; G03B 5/00; G03B 13/36; G03B 2205/0007; G03B 2217/002; G03B 30/00; G03B 17/02
See application file for complete search history.

(56) References Cited

U.S. PATENT DOCUMENTS

| | | | |
|---|---|---|---|
| 8,432,485 B1 | 4/2013 | Martinez et al. | |
| 9,241,097 B1* | 1/2016 | Tam | H04N 5/2254 |
| 2001/0050721 A1 | 12/2001 | Miyake | |
| 2005/0242410 A1 | 11/2005 | Groot et al. | |
| 2008/0143871 A1* | 6/2008 | Go | H04N 5/2257 |
| | | | 348/E5.025 |
| 2009/0040368 A1 | 2/2009 | Lin et al. | |
| 2010/0182498 A1* | 7/2010 | Niwa | 348/374 |
| 2011/0267535 A1* | 11/2011 | Seo | H01L 27/14618 |
| | | | 348/374 |
| 2012/0276951 A1* | 11/2012 | Webster | H04N 5/2257 |
| | | | 348/374 |
| 2012/0279695 A1 | 11/2012 | Tokura | |
| 2013/0050571 A1* | 2/2013 | Tam | H04N 5/2257 |
| | | | 348/374 |
| 2013/0242183 A1 | 9/2013 | Lee | |
| 2013/0329106 A1 | 12/2013 | Bigioi et al. | |
| 2014/0117480 A1* | 5/2014 | Jan | H01L 27/14625 |
| | | | 257/E31.127 |
| 2015/0264290 A1 | 9/2015 | Happoya et al. | |
| 2017/0111560 A1* | 4/2017 | Chen | H04N 5/2257 |
| 2018/0024307 A1 | 1/2018 | Lo et al. | |

FOREIGN PATENT DOCUMENTS

| | | |
|---|---|---|
| CN | 205179201 U | 4/2016 |
| CN | 106803870 A | 6/2017 |
| JP | 2015-177310 A | 10/2015 |
| KR | 10-2008-011754 A | 2/2008 |
| KR | 10-2008-0088718 A | 10/2008 |
| KR | 10-2012-0029875 A | 3/2012 |
| KR | 10-1834953 B1 | 3/2018 |

* cited by examiner

CAMERA MODULE AND OPTICAL DEVICE COMPRISING SAME

CROSS REFERENCE TO RELATED APPLICATIONS

This application is a Continuation of U.S. application Ser. No. 16/982,504, filed on Sep. 18, 2020, which is the National Phase of PCT International Application No. PCT/KR2019/003108, filed on Mar. 18, 2019, which claims priority under 35 U.S.C. 119(a) to Patent Application No. 10-2018-0031895, filed in Republic of Korea on Mar. 20, 2018, all of these applications are hereby expressly incorporated by reference into the present application.

TECHNICAL FIELD

Embodiments relate to a camera module and an optical device including the same.

BACKGROUND ART

Technology of a voice coil motor (VCM), which is used in conventional general camera modules, is difficult to apply to a micro-scale camera module intended to exhibit low power consumption, and study related thereto has been actively conducted.

In the case of a camera module configured to be mounted in a small electronic product, such as a smartphone, the camera module may frequently receive shocks when in use, and may undergo fine shaking due to, for example, user hand tremor while capturing an image. In consideration of this fact, technology for additionally installing a device for inhibiting transfer of hand tremor to a camera module has recently been developed.

DISCLOSURE

Technical Problem

Embodiments provide a camera module and an optical device capable of improving optical performance, securing reliability of wire bonding between a printed circuit board and an image sensor, and increasing bonding force between a stiffener and the image sensor.

Technical Solution

A camera module according to an embodiment may include a lens barrel, a holder, a filter disposed in the holder, a printed circuit board having therein an opening, a stiffener including a first region corresponding to the opening and a second region in which the printed circuit board is disposed, and an image sensor disposed in the first region of the stiffener. The first region of the stiffener may include a protruding portion protruding further than the second region of the stiffener, and the image sensor may be disposed on the upper surface of the protruding portion.

The height from the lower surface of the stiffener to the upper surface of the protruding portion may be less than the height to the upper surface of the printed circuit board disposed on the stiffener.

The protruding portion may include a plurality of protrusions spaced apart from each other. The camera module may further include an adhesive member disposed in the space between the upper surfaces of the plurality of protrusions and the lower surface of the image sensor and in the space between the plurality of protrusions.

The thickness of the image sensor may be less than the thickness of the printed circuit board.

The camera module may further include a first adhesive member disposed between the second region of the stiffener and the lower surface of the printed circuit board. The first adhesive member may include therein an opening corresponding to the opening in the printed circuit board.

In addition, the camera module may further include a second adhesive member disposed between the upper surface of the protruding portion and the lower surface of the image sensor. The second adhesive member may be located at a higher position than the first adhesive member.

The printed circuit board may include a first terminal, and the image sensor may include a second terminal. The camera module may further include a wire connecting the first terminal to the second terminal.

The ratio of the first height from the upper surface of the second region of the stiffener to the upper surface of the protruding portion to the second height from the lower surface of the stiffener to the upper surface of the second region of the stiffener may be 1:0.67 to 1:2.1.

A camera module according to another embodiment may include a lens barrel, a holder, a filter disposed in the holder, a printed circuit board having therein an opening, a stiffener including a first region corresponding to the opening and a second region in which the printed circuit board is disposed, and an image sensor disposed in the first region of the stiffener. The first region of the stiffener may include a cavity recessed further than the second region of the stiffener, and the image sensor may be disposed on the bottom surface of the cavity.

A camera module according to still another embodiment may include a lens barrel, a holder, a filter disposed in the holder, a printed circuit board having therein an opening, a stiffener including a first region corresponding to the opening and a second region in which the printed circuit board is disposed, an image sensor disposed in the first region of the stiffener, and an adhesive member including a first adhesive member disposed between the first region of the stiffener and the image sensor and a second adhesive member disposed between the second region of the stiffener and the printed circuit board. The first adhesive member and the second adhesive member may be connected to each other.

Advantageous Effects

Embodiments are capable of improving the optical performance of a camera module, securing reliability of wire bonding between a printed circuit board and an image sensor, and increasing bonding force between a stiffener and the image sensor.

BEST MODE

Figure 1:
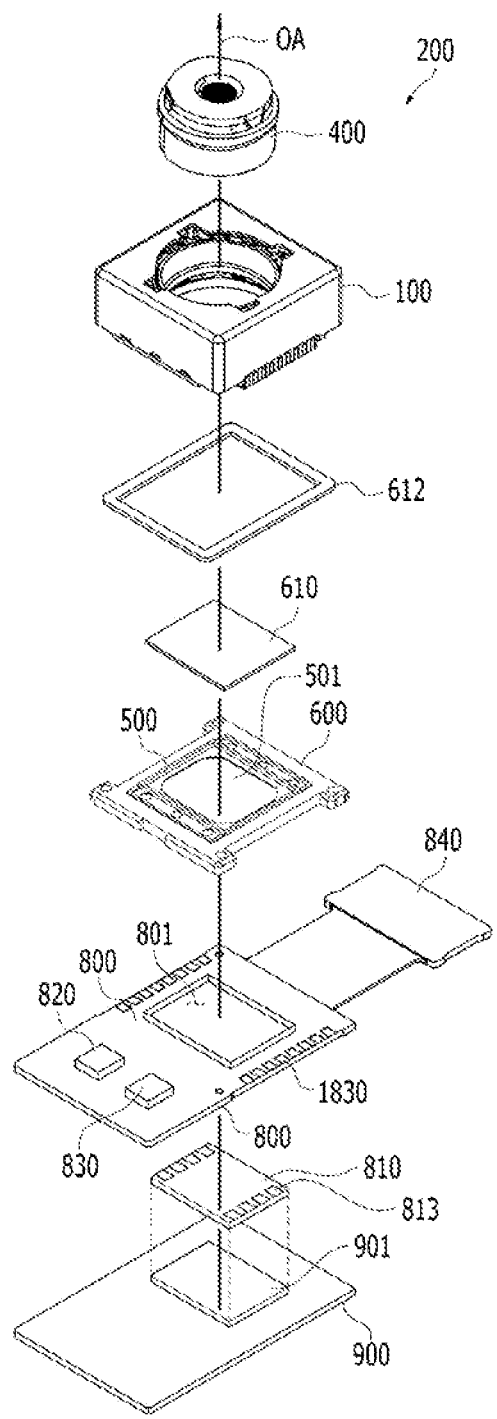
FIG. 1 is an exploded perspective view of a camera module according to an embodiment.

Hereinafter, embodiments of the present disclosure, which may concretely realize the objects described above, will be described with reference to the accompanying drawings.

In the following description of the embodiments, it will be understood that, when each element is referred to as being "on" or "under" another element, it can be directly on or under the other element, or can be indirectly formed such that one or more intervening elements are also present. In addition, when an element is referred to as being "on or under", "under the element" as well as "on the element" may be included based on the element.

In addition, the relational terms "first", "second", "on/upper part/above", and "under/lower part/below" are used herein only to distinguish between one subject or element and another subject or element without necessarily requiring or involving any physical or logical relationship or sequence between such subjects or elements. Wherever possible, the same reference numerals will be used throughout the drawings to refer to the same parts.

Additionally, the terms "comprises", "includes", and "has" described herein should be interpreted not to exclude other elements but to further include such other elements, since the corresponding elements may be inherent unless mentioned otherwise. In addition, the term "corresponding to" herein may encompass at least one of the meanings of "facing" and "overlapping".

Hereinafter, a camera module and an optical device including the same according to embodiments will be described with reference to the accompanying drawings. For convenience of description, a camera module according to the embodiments will be described using the Cartesian coordinate system (x, y, z), but the embodiments are not limited thereto, and may be described using other coordinate systems. In the respective drawings, the x-axis and the y-axis may be directions perpendicular to the z-axis, which is an optical-axis (OA) direction, the z-axis direction, which is the optical-axis (OA) direction, may be referred to as a 'first direction', the x-axis direction may be referred to as a 'second direction', and the y-axis direction may be referred to as a 'third direction'.

A 'hand tremor compensation function' applied to a small camera module of a mobile device such as a smartphone or a tablet PC may be a function of moving a lens in a direction perpendicular to the optical-axis direction or tilting the lens with respect to the optical axis so as to cancel vibration (or motion) caused by user hand tremor.

In addition, an 'autofocus function' may be a function of automatically focusing on an object by moving the lens in the optical-axis direction according to the distance to the object so that an image sensor obtains a clear image of the object.

Figure 2:
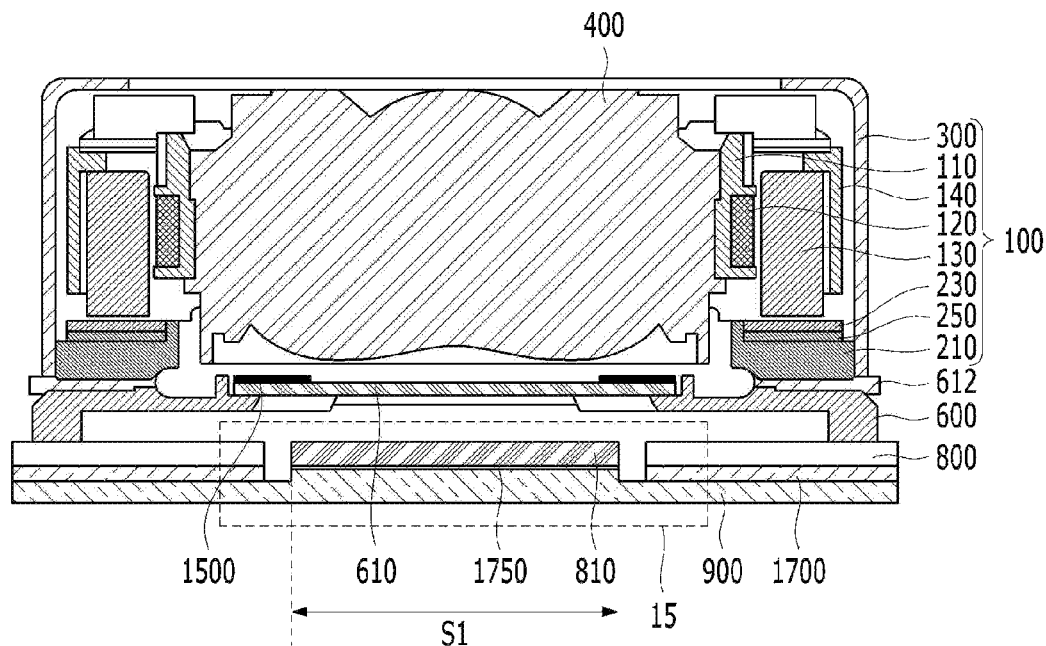
FIG. 2 is a cross-sectional view of an embodiment of the camera module of FIG. 1.
Figure 3:
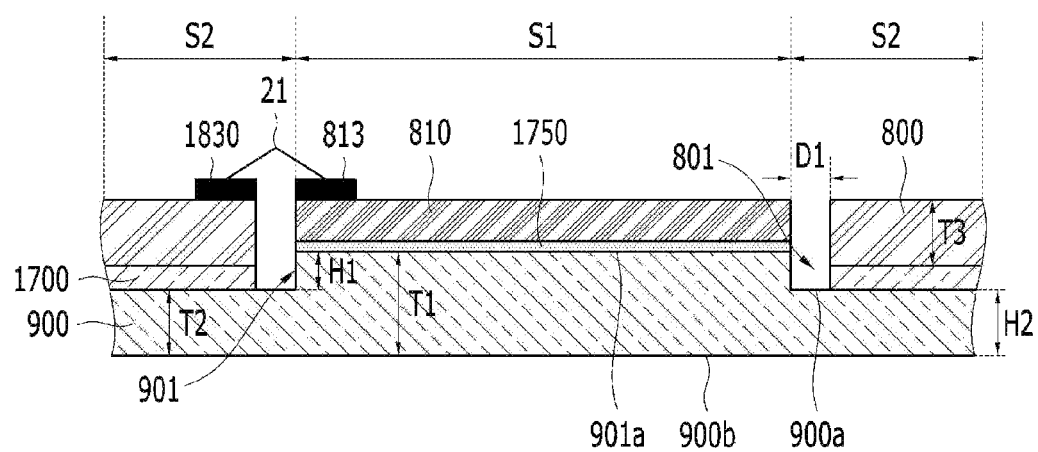
FIG. 3 is an enlarged view of the portion indicated by the dotted line in FIG. 2.

FIG. 1 is an exploded perspective view of a camera module 200 according to an embodiment, FIG. 2 is a cross-sectional view of an embodiment of the camera module 200 of FIG. 1, and FIG. 3 is an enlarged view of the portion indicated by the dotted line 15 in FIG. 2.

Referring to FIGS. 1 to 3, the camera module 200 may include a lens or a lens barrel 400, a lens-moving apparatus 100, a filter 610, a holder 600, a printed circuit board 800, a stiffener 900, and an image sensor 810. Here, the "camera module" may be referred to as an "image capture device" or a "photographing device", and the holder 600 may be referred to as a sensor base.

In addition, the camera module 300 may further include a blocking member 1500 disposed on the filter 610.

In addition, the camera module 300 may further include an adhesive member 612.

In addition, the camera module 300 may further include a motion sensor 820, a controller 830, and a connector 840.

The lens or the lens barrel 400 may be mounted in a bobbin 110 of the lens-moving apparatus 100.

The lens-moving apparatus 100 may move the lens or the lens barrel 400.

The camera module 200 may be any one of an autofocus (AF) camera module and an optical image stabilizer (OIS) camera module. The AF camera module is a camera module configured to perform only an autofocus function, and the OIS camera module is a camera module configured to perform an autofocus function and an optical image stabilizer (OIS) function.

For example, the lens-moving apparatus 100 may be an AF lens-moving apparatus or an OIS lens-moving apparatus, and the meanings of "AF" and "OIS" may be the same as those of the AF camera module and the OIS camera module.

For example, the lens-moving apparatus 100 of the camera module 200 may be an OIS lens-moving apparatus.

The lens-moving apparatus 100 may include a housing 140, a bobbin 110 disposed in the housing 140 to allow the lens or the lens barrel 400 to be mounted thereto, a first coil 120 disposed at the bobbin 110, a magnet 130 disposed in the housing 140 so as to face the first coil 120, at least one upper elastic member (not shown) coupled to the upper portion of the bobbin 110 and the upper portion of the housing 140, at least one lower elastic member (not shown) coupled to the lower portion of the bobbin 110 and the lower portion of the housing 140, a second coil 230 disposed under the bobbin 110 (and/or the housing 140), a printed circuit board 250 disposed under the second coil 230, and a base 210 disposed under the printed circuit board 250.

In addition, the lens-moving apparatus 100 may further include a cover member 300 coupled to the base 210 to provide space for accommodating the components of the lens-moving apparatus 100 together with the base 210.

In addition, the lens-moving apparatus 100 may further include a support member (not shown) electrically connecting the printed circuit board 250 to the upper elastic member and supporting the housing 140 with respect to the base 210. Each of the first coil 120 and the second coil 230 may be electrically connected to the printed circuit board 250, and may receive a driving signal (driving current) from the printed circuit board 250.

For example, the upper elastic member may include a plurality of upper springs, the support member may include support members connected to the upper springs, and the first coil 120 may be electrically connected to the printed circuit board 250 via the upper springs and the support member. The printed circuit board 250 may include a plurality of terminals, and some of the plurality of terminals may be electrically connected to the first coil 120 and/or the second coil 230.

The bobbin 110 and the lens or the lens barrel 400 coupled thereto may be moved in the optical-axis direction due to the electromagnetic force generated by interaction between the first coil 120 and the magnet 130, and accordingly, the displacement of the bobbin 110 in the optical-axis direction may be controlled, whereby an AF operation may be implemented.

In addition, the housing 140 may be moved in a direction perpendicular to the optical axis due to the electromagnetic force generated by interaction between the second coil 230 and the magnet 130, and accordingly, a hand tremor compensation or OIS operation may be implemented.

In addition, in order to implement an AF feedback operation, the lens-moving apparatus 100 of the camera module 200 may further include a sensing magnet (not shown) disposed at the bobbin 110 and an AF position sensor (e.g. a hall sensor) (not shown) disposed in the housing 140. In addition, the lens-moving apparatus 100 may further include a printed circuit board (not shown) disposed in the housing and/or on the base to allow the AF position sensor to be disposed or mounted thereon. In another embodiment, the AF position sensor may be disposed at the bobbin, and the sensing magnet may be disposed in the housing. In addition, the lens-moving apparatus 100 may further include a balancing magnet disposed at the bobbin 110 so as to correspond to the sensing magnet.

The AF position sensor may output an output signal according to the result of detection of the magnitude of the magnetic field of the sensing magnet upon movement of the bobbin 100. The AF position sensor may be electrically connected to the printed circuit board 250 via the upper elastic member (or the lower elastic member) and/or the support member. The printed circuit board 250 may provide a driving signal to the AF position sensor, and the output of the AF position sensor may be transmitted to the printed circuit board 250.

In another embodiment, the lens-moving apparatus 100 may be an AF lens-moving apparatus, and the AF lens-moving apparatus may include a housing, a bobbin disposed in the housing, a coil disposed at the bobbin, a magnet disposed in the housing, at least one elastic member coupled to the bobbin and the housing, and a base disposed under the bobbin (and/or the housing). For example, the elastic member may include the upper elastic member and the lower elastic member described above.

A driving signal (e.g. driving current) may be provided to the coil, and the bobbin may be moved in the optical-axis direction due to the electromagnetic force generated by interaction between the coil and the magnet. In another embodiment, the coil may be disposed in the housing, and the magnet may be disposed at the bobbin.

In addition, in order to implement an AF feedback operation, the AF lens-moving apparatus may further include a sensing magnet disposed at the bobbin, an AF position sensor (e.g. a hall sensor) disposed in the housing, and a printed circuit board disposed or mounted in the housing and/or on the base to allow the AF position sensor to be mounted thereon. In another embodiment, the AF position sensor may be disposed at the bobbin, and the sensing magnet may be disposed in the housing.

The camera module according to another embodiment may include, instead of the lens-moving apparatus 100 of FIG. 1, a housing coupled to the lens or the lens barrel 400 to fix the lens or the lens barrel 400, and the housing may be coupled or attached to the upper surface of the holder 600. The housing attached or fixed to the holder 600 may not be moved, and the position of the housing may be fixed in the state in which the housing is attached to the holder 600.

The printed circuit board may be electrically connected to the coil and the AF position sensor, a driving signal may be provided to each of the coil and the AF position sensor through the printed circuit board, and the output of the AF position sensor may be transmitted to the printed circuit board.

The holder 600 may be disposed under the base 210 of the lens-moving apparatus 100.

The filter 610 may be mounted to the holder 600, and the holder 600 may include a seating portion 500 on which the filter 610 is seated.

The adhesive member 612 may couple or attach the base 210 of the lens-moving apparatus 100 to the holder 600. For example, the adhesive member 612 may be disposed between the lower surface of the base 210 and the upper surface of the holder 600, and may bond these two components to each other.

The adhesive member 612 may serve not only to bond components, as described above, but also to prevent foreign substances from entering the lens-moving apparatus 100. For example, the adhesive member 612 may be an epoxy, a thermosetting adhesive, or an ultraviolet curable adhesive.

The filter 610 may be disposed in the seating portion 500 of the holder 600.

The seating portion 500 of the holder 600 may include a protruding portion 500a protruding from the upper surface of the holder 600, without being limited thereto. In another embodiment, the seating portion may be a recess, a cavity, or a hole, which is concavely formed in the upper surface of the holder 600.

The protruding portion 500a of the seating portion 500 may serve to prevent the lower end of the lens or the lens barrel 400 from coming into contact with or colliding with the filter 610 (and/or the blocking member 1500).

The protruding portion 500a may be formed to protrude along the side surface of the filter 610 in the optical-axis direction. For example, the protruding portion 500a may be disposed around the side surface of the filter 610 so as to surround the side surface of the filter 610.

The inner surface of the protruding portion 500a may be provided so as to face the side surface of the filter 610, and these two components may be spaced apart from each other.

The reason for this is to secure processing tolerance to facilitate mounting of the filter 610 in the seating portion 500 of the holder 600.

In addition, the upper surface of the protruding portion 500a may be positioned above the upper surface 610 of the filter 610 in the optical-axis direction. The reason for this is to prevent the lower end of the lens or the lens barrel 400 from directly colliding with the filter 610 when the lens or the lens barrel 400 is mounted in the lens-moving apparatus 100 and moves in the optical-axis direction or moves toward the filter 610 due to an external impact.

The shape of the protruding portion 500a viewed from above may match the shape of the filter 610, without being limited thereto. In another embodiment, the shape of the protruding portion 500a may be similar to or different from the shape of the filter 610.

The holder 600 may have an opening 501 formed in the region thereof in which the filter 610 is mounted or disposed so that light passing through the filter 610 enters the image sensor 810.

For example, the opening 501 may penetrate the holder 600 in the optical-axis direction, and may be referred to as a "through-hole".

For example, the opening 501 may penetrate the center of the holder 600 and may be provided in the seating portion 500, and the area of the opening 501 may be smaller than the area of the filter 610.

The holder 600 may be disposed on the printed circuit board 800, and may accommodate the filter 610 therein. The holder 600 may support the lens-moving apparatus 100 positioned thereon. The lower surface of the base 210 of the lens-moving apparatus 100 may be disposed on the upper surface of the holder 600.

For example, the lower surface of the base 210 of the lens-moving apparatus 100 may be in contact with the upper surface of the holder 600, and may be supported by the upper surface of the holder 600.

For example, the filter 610 may be disposed in the seating portion 500 of the holder 600.

The filter 610 may serve to block light in a specific frequency band, among the light passing through the lens barrel 400, from entering the image sensor 810.

For example, the filter 610 may be an infrared cut-off filter, without being limited thereto. For example, the filter 610 may be disposed parallel to the x-y plane, which is perpendicular to the optical axis OA.

The filter 610 may be attached to the seating portion 500 of the holder 600 using an adhesive member (not shown) such as UV epoxy.

The printed circuit board 800 may be disposed under the holder 600, and the holder 600 may be disposed on the upper surface of the printed circuit board 800.

The holder 600 may be attached or fixed to the upper surface of the printed circuit board 800 using an adhesive member such as an epoxy, a thermosetting adhesive, or an ultraviolet curable adhesive. In this case, the adhesive member may be disposed between the lower surface of the holder 600 and the upper surface of the printed circuit board 800.

The printed circuit board 800 may have therein an opening 801 corresponding to the opening 501 in the holder 600. The opening 801 in the printed circuit board 800 may be a through-hole penetrating the printed circuit board 800 in the optical-axis direction.

The image sensor 810 may be disposed in the opening 801 in the printed circuit board 800.

The stiffener 900 may be disposed under the printed circuit board 800, and may include a protruding portion 901 formed corresponding to the opening 801 in the printed circuit board 800 to allow the image sensor 810 to be mounted thereto.

The protruding portion 901 may protrude from the region of the upper surface of the stiffener 900 in the optical-axis direction. The image sensor 810 may be disposed on the upper surface of the protruding portion 901, and may be exposed through the opening 801 in the printed circuit board 800.

The image sensor 810 disposed on the upper surface of the protruding portion 901 of the stiffener 900 may be electrically connected to the printed circuit board 800 via a wire 21. For example, the wire 21 may connect a terminal 813 of the image sensor 810 and a terminal 1830 of the printed circuit board 800 to each other.

The stiffener 900 is a plate-type member having a predetermined thickness and hardness, and may stably support the image sensor 810 and prevent damage to the image sensor due to an external impact or contact.

In addition, the stiffener 900 may improve a heat dissipation effect of dissipating the heat generated from the image sensor to the outside.

For example, the stiffener 900 may be formed of a metal material having high thermal conductivity, such as SUS or aluminum, without being limited thereto. In another embodiment, the stiffener 900 may be formed of glass epoxy, plastic, or synthetic resin.

In addition, the stiffener 900 may be electrically connected to a ground terminal of the printed circuit board 800, and thus may serve as a ground for protecting the camera module from electrostatic discharge (ESD).

The image sensor 810 may be a part on which the light that has passed through the filter 610 is incident and in which an image included in the light is formed.

The printed circuit board 800 may be provided with various circuits, elements, and controllers in order to convert an image formed by the image sensor 810 into an electrical signal and to transmit the electrical signal to an external device. A circuit pattern, which is electrically connected to the image sensor and various elements, may be formed on the printed circuit board 800.

The holder 600 may be referred to as a first holder, and the printed circuit board 800 may be referred to as a second holder.

The image sensor 810 may receive an image included in the light introduced through the lens-moving apparatus 100, and may convert the received image into an electrical signal.

The filter 610 and the image sensor 810 may be disposed so as to be spaced apart from each other and to face each other in the optical-axis (OA) direction or the first direction.

In addition, the protruding portion 500a of the holder 600 may be disposed so as to face the filter 610 in the optical-axis direction.

The blocking member 1500 may be disposed on the upper surface of the filter 610. The blocking member 1500 may be referred to as a "masking part".

For example, the blocking member 1500 may be disposed on the edge portion of the upper surface of the filter 610, and may serve to block at least a portion of the light traveling toward the edge portion of the filter 610 through the lens or the lens barrel 400 from passing through the filter 610. For example, the blocking member 1500 may be coupled or attached to the upper surface of the filter 1610.

For example, the filter 610 may be formed in a rectangular shape when viewed in the optical-axis direction, and the blocking member 1500 may be formed to be symmetrical with respect to the filter 610 along each side of the upper surface of the filter 610.

In this case, the blocking member 1500 may be formed to have a predetermined width on each side of the upper surface of the filter 1610.

The blocking member 1500 may be formed of an opaque material. For example, the blocking member 1500 may be an opaque and adhesive material that is applied to the filter 610, or may be provided in the form of a film that is attached to the filter 610.

The filter 610 and the image sensor 810 may be disposed so as to face each other in the optical-axis direction, and at least a portion of the blocking member 1500 may overlap the terminal 1830 and/or the wire 21 disposed on the printed circuit board 800 in the optical-axis direction.

The wire 21 and the terminal 1830 may be formed of a conductive material such as gold, silver, copper, or a copper alloy, and this conductive material may have a property of reflecting light. The light that has passed through the filter 610 may be reflected by the terminal 1830 of the printed circuit board 800 and the wire 21, and an instantaneous flash, i.e. a flare phenomenon, may occur due to this reflected light. Such a flare phenomenon may distort the image formed by the image sensor 810 or may deteriorate the quality of the image.

Since the blocking member 1500 is disposed such that at least a portion thereof overlaps the terminal 1830 and/or the wire 21 in the optical-axis direction, the blocking member 1500 may block the light traveling toward the terminal 1830 of the printed circuit board 800 and/or the wire 21, among the light that has passed through the lens or the lens barrel 400, thereby preventing the occurrence of the aforementioned flare phenomenon, thus preventing distortion of an image formed by the image sensor 810 or deterioration in the quality of an image.

The motion sensor 820 may be mounted or disposed on the printed circuit board 800, and may be electrically connected to the controller 830 via a circuit pattern provided on the printed circuit board 800.

The motion sensor 820 outputs rotating angular speed information according to the motion of the camera module 200. The motion sensor 820 may be implemented as a 2- or 3-axis gyro sensor or an angular speed sensor.

The controller 830 is mounted or disposed on the printed circuit board 800.

The printed circuit board 800 may be electrically connected to the lens-moving apparatus 100. For example, the printed circuit board 800 may be electrically connected to the printed circuit board 250 of the lens-moving apparatus 100.

For example, a driving signal may be provided to each of the first coil 120 and the second coil 230 of the lens-moving apparatus 100 through the printed circuit board 800, and a driving signal may be provided to the AF position sensor (or the OIS position sensor). Further, the output of the AF position sensor (or the OIS position sensor) may be transmitted to the printed circuit board 800.

The connector 840 may be electrically connected to the printed circuit board 800, and may include a port to be electrically connected to an external device.

An adhesive member 1750 may be disposed between the lower surface of the image sensor 810 and the upper surface 901a of the protruding portion 901, and the image sensor 810 may be attached or fixed to the upper surface 901a of the protruding portion 901 using the adhesive member 1750. The adhesive member 1750 may be an epoxy, a thermosetting adhesive, an ultraviolet curable adhesive, or an adhesive film, without being limited thereto.

In addition, an adhesive member 1700 may be disposed between the lower surface of the printed circuit board 800 and the upper surface 900a of the second region S2 of the stiffener 900, and the printed circuit board 800 may be attached or fixed to the stiffener 900 using the adhesive member 1700. For example, the adhesive member 1700 may be an epoxy, a thermosetting adhesive, an ultraviolet curable adhesive, or an adhesive film, without being limited thereto.

The area of the upper surface of the protruding portion 901 may be equal to or greater than the area of the lower surface of the image sensor 810. For example, the edge of the lower surface of the image sensor 810 may be in contact with the edge of the upper surface 901a of the protruding portion 901, without being limited thereto. In another embodiment, the edge of the lower surface of the image sensor 810 may be spaced apart from the edge of the upper surface 901a of the protruding portion 901.

For example, the ratio (H1:H2) of the first height H1 from the upper surface 900a of the second region S2 of the stiffener 900 to the upper surface 901a of the protruding portion 901 to the second height H2 from the lower surface 900b of the stiffener 900 to the upper surface 900a of the second region S2 of the stiffener 900 may be 1:0.67 to 1:2.1.

When the value (H2/H1) obtained by dividing the second height by the first height is less than 0.67, the stiffener 900 is liable to be bent or deformed to such an extent that it is not capable of supporting the printed circuit board 800.

Further, when the value (H2/H1) obtained by dividing the second height by the first height is greater than 2.1, the height by which the protruding portion 901 protrudes is too small to improve the flatness of the stiffener 900, and the effect of reducing the height difference between the upper surface of the image sensor 810 and the upper surface of the printed circuit board 800 in the optical-axis direction is reduced, and thus the reliability of wire bonding between these two components may not be secured.

For example, H1 may be 80 [μm] to 150 [μm], and H2 may be 100 [μm] to 170 [μm].

The height from the lower surface 900b of the stiffener 900 to the upper surface 901a of the protruding portion 901 of the stiffener 900 may be less than the height to the upper surface of the printed circuit board 800 disposed on the stiffener 900.

For example, the stiffener 900 may include a first region S1 and a second region S2. The first region S1 may be the region to which the image sensor 810 is attached, and the second region S2 may be the region to which the printed circuit board 800 is attached.

The first region S1 of the stiffener 900 may include a protruding portion 901 protruding on the basis of the second region S2 in the direction from the lower surface of the stiffener toward the upper surface of the stiffener, and the image sensor 810 may be disposed on the upper surface of the protruding portion 901.

For example, the first region S1 of the stiffener 900 may include a protruding portion 901 that protrudes further than the second region S2 of the stiffener 900.

The thickness T1 of the first region S1 of the stiffener 900 is greater than the thickness T2 of the second region S2 of the stiffener 900 (T1>T2).

Since T1>T2, warpage of the upper surface 901a of the protruding portion 901 of the stiffener 900 may be suppressed, and the flatness of the upper surface 901a of the protruding portion 901 may be improved. Accordingly, in the embodiment, the reliability of the image sensor 810 disposed on the upper surface of the protruding portion 901 may be improved, and the optical performance of the camera module may be improved.

Since the second region S2 of the stiffener 900 has a constant thickness, it may not affect the overall height of the camera module according to the embodiment.

Since the image sensor 910 is disposed on the upper surface 901a of the protruding portion 901, the height difference between the upper surface of the printed circuit board 800 and the upper surface of the image sensor 810 may be reduced, with the result that the length of the wire between the printed circuit board 800 and the image sensor 810 may be reduced, and thus the reliability of wire bonding may be improved.

The spacing distance D1 between the side surface of the protruding portion 901 of the stiffener 900 and the side surface of the opening in the printed circuit board may be 100 [μm] to 250 [μm].

When D1 is less than 100 [μm], the attachment tolerance within which the printed circuit board 800 is attached to the stiffener 900 may be reduced, which may cause misalignment between the opening 801 in the printed circuit board 800 and the protruding portion 901 of the stiffener 900 and damage to the printed circuit board 800 due to a collision between the printed circuit board 800 and the protruding portion 901.

When D1 is greater than 250 [μm], the spacing distance between the image sensor and the printed circuit board may be excessive, and thus the reliability of wire bonding may be deteriorated.

Figure 4A:
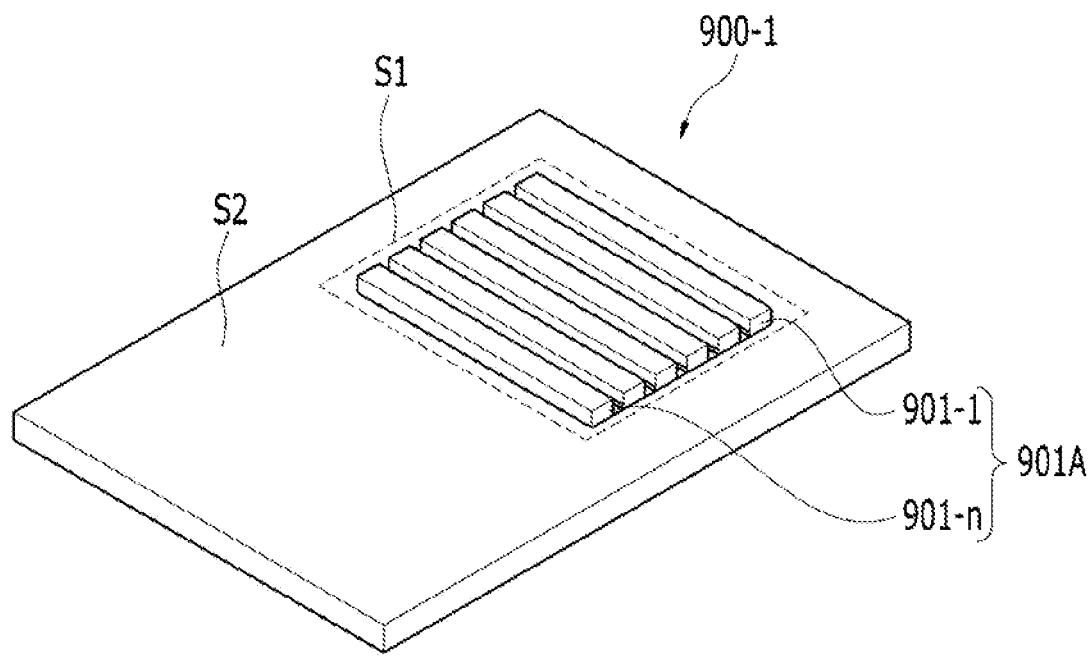
FIG. 4A is a perspective view of a stiffener according to another embodiment.
Figure 5:
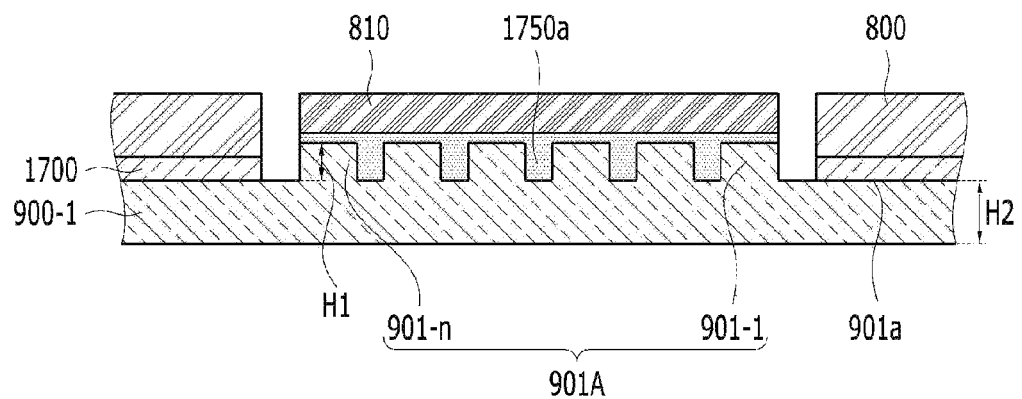
FIG. 5 shows the stiffener, the image sensor, and the printed circuit board of FIG. 4A.

FIG. 4A is a perspective view of a stiffener 900-1 according to another embodiment, and FIG. 5 shows the stiffener 900-1, the image sensor 810, and the printed circuit board 800 of FIG. 4A.

Referring to FIGS. 4A and 5, the stiffener 900-1 may include a protruding portion 901A disposed in the first region S1 to allow the image sensor to be disposed thereon or attached thereto.

The protruding portion 901A may include a plurality of protrusions 901-1 to 901-n (n is a natural number, and n>1).

The plurality of protrusions 901-1 to 901-n may be spaced apart from each other, and each of the plurality of protrusions 901-1 to 901-n may protrude in the optical-axis direction on the basis of the upper surface 900a of the second region of the stiffener 901-1.

An adhesive member 1750a may be disposed between the upper surfaces of the plurality of protrusions 901-1 to 901-n and the lower surface of the image sensor 810.

In addition, the adhesive member 1750a may be disposed between the plurality of protrusions 901-1 to 901-n, or may be charged in the space between the plurality of protrusions 901-1 to 901-n.

The description made with reference to FIG. 3 may apply to H1 and H2 of FIG. 5.

Each of the plurality of protrusions 901-1 to 901-n may have a line shape or a stripe shape, without being limited thereto. In another embodiment, it may be formed in the shape of a net, a plurality of dots, or a plurality of islands.

Figure 4B:
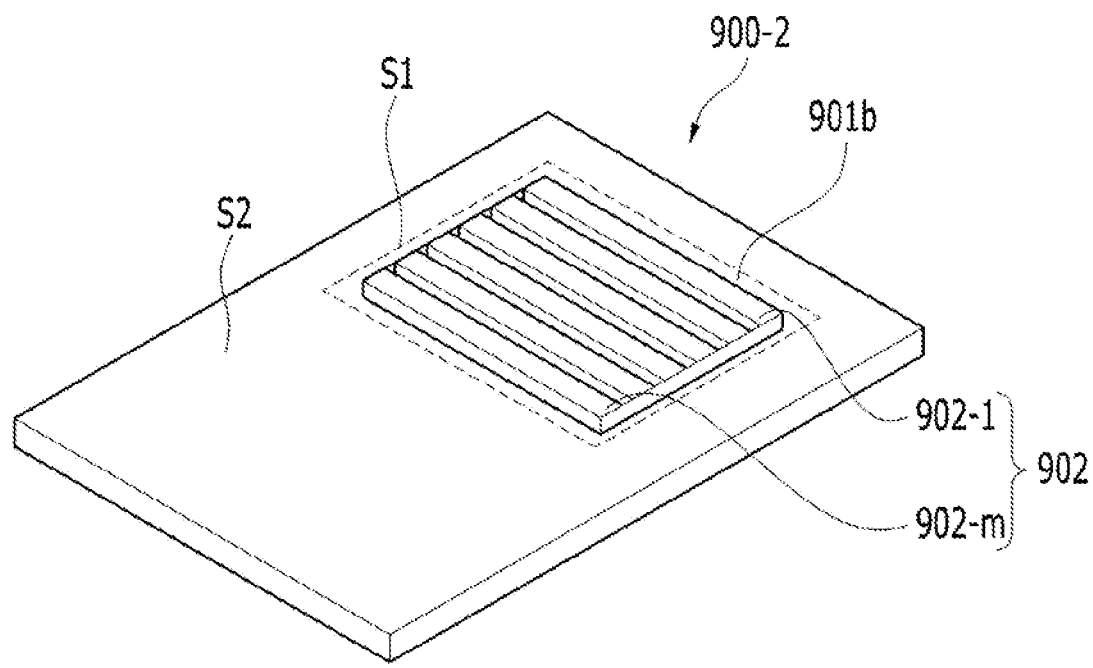
FIG. 4B is a perspective view of a stiffener according to still another embodiment.

FIG. 4B is a perspective view of a stiffener 900-2 according to still another embodiment.

Referring to FIG. 4B, the stiffener 900-2 may include a protruding portion 902, which includes a plurality of protrusions 902-1 to 902-m (m is a natural number, and m>1) disposed in the first region S1.

Each of the plurality of protrusions 902-1 to 902-m may protrude from the upper surface of the stiffener 901-2 in the optical-axis direction.

Each of the plurality of protrusions 901-2 to 902-m may have a line shape or a stripe shape.

One ends of the plurality of protrusions 901-2 to 902-m may be connected to each other. In addition, the opposite ends of the plurality of protrusions 902-1 to 902-m may be connected to each other.

As described with reference to FIG. 4A, an adhesive member may be charged in the space between the upper surfaces of the plurality of protrusions 902-1 to 902-m and the lower surface of the image sensor 810 and the space between the plurality of protrusions 902-1 to 902-m.

The stiffener and the image sensor are fixed to each other using an adhesive member. Depending on the material of the stiffener, the bonding force between the stiffener and the image sensor may be reduced, which may cause a problem of reliability associated with bonding.

In addition, in general, when the stiffener and the image sensor are bonded to each other, pressure is applied to an adhesive. Due to this pressure, the adhesive may overflow out of the bonding surface between the stiffener and the image sensor, and thus the bonding force between these two components may be reduced.

In addition, in order to prevent overflow of the adhesive, if the area or size of the adhesive is made smaller than the size (or the area) of the lower surface of the image sensor so that the adhesive is placed inside the edge of the lower surface of the image sensor, the flatness of the image sensor is deteriorated during wire bonding, and thus reliability of wire bonding may be deteriorated.

In the embodiments shown in FIGS. 4A to 5, an uneven portion having a predetermined size is formed on the upper surface of the protruding portion 901A, thereby increasing the bonding area between the adhesive member 1750a and the protruding portion 901A or 902 of the stiffener 900-1 or 900-2, thus increasing bonding force between the stiffener 900-1 or 900-2 and the image sensor 810.

Here, the convex portions of the uneven portion may be the above-described protrusions 901-1 to 901-n or 902-1 to 902-m, and the concave portions of the uneven portion may be the spaces between the protrusions 901-1 to 901-n or 902-1 to 902-m.

In addition, even when pressure is applied to the adhesive member 1750a to bond the image sensor 810 and the protruding portion 901A or 902 to each other, the convex portions of the uneven portion or the protrusions 901-1 to 901-n or 902-1 to 902-m may suppress overflow of the adhesive, thereby preventing deterioration in the bonding force and preventing the image sensor from being contaminated by the adhesive.

In addition, since overflow of the adhesive is suppressed as described above, the edge of the adhesive member 1750a may extend to the edge of the lower surface of the image sensor 810, thereby preventing deterioration in the reliability of wire bonding when wire bonding is performed between the image sensor and the printed circuit board.

Figure 6:
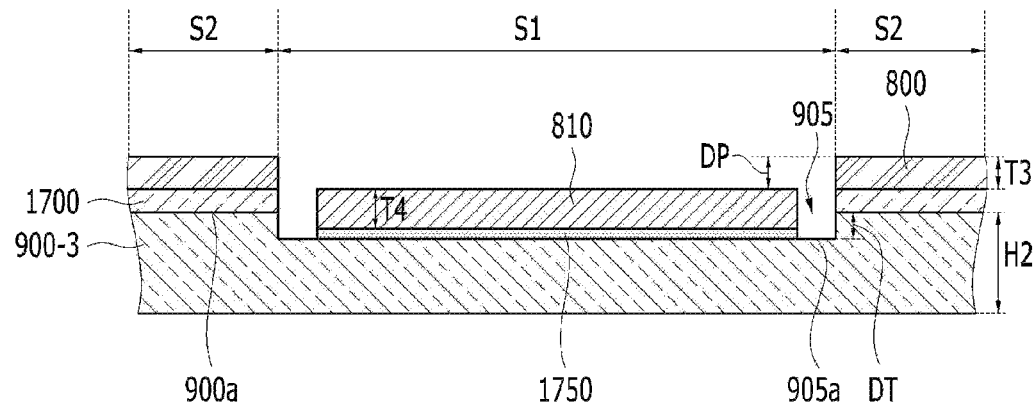
FIG. 6 shows an image sensor and a printed circuit board disposed on a stiffener according to still another embodiment.

FIG. 6 shows an image sensor 810 and a printed circuit board 800 disposed on a stiffener 900-3 according to still another embodiment.

Referring to FIG. 6, the stiffener 900-3 may include a cavity 905 or a recess formed in a first region S1. The cavity 905 may have a structure that is recessed from the upper surface of the stiffener 900-3.

For example, the first region S1 of the stiffener 900-3 may include a cavity 905 that is depressed further than a second region S2 of the stiffener 900-3.

The image sensor 810 may be disposed in the cavity 905, and may be attached or fixed to a bottom surface 905a of the cavity 905 using an adhesive member 1750.

The printed circuit board 800 may be disposed in the second region S2 of the stiffener 900-3, and the lower surface of the printed circuit board 800 may be attached or fixed to the second region S2 of the stiffener 900-3 using the adhesive member 1700.

In order to increase the bonding force between the stiffener 900-3 and the image sensor 810, the bottom surface 905a of the cavity 905 of the stiffener 900-3 of FIG. 6 may be provided with an uneven portion or protrusions (not shown), which are the same as or similar to those described with reference to FIGS. 4A and 4B.

The image sensor 810 and the printed circuit board 800 may have different thicknesses. That is, the thickness of each of the image sensor and the printed circuit board, which are mounted in the camera module, is not uniform, but may vary according to customers' requests, design specifications, or the size of the camera module. Upon wire bonding between the image sensor and the printed circuit board having various thicknesses, if the height difference between the terminal of the image sensor and the terminal of the printed circuit board in the optical-axis direction is large, the reliability of wire bonding may be deteriorated.

The depth DT from the upper surface 900a of the stiffener 900-3 to the bottom surface 905a of the cavity 905 may be less than or equal to the thickness T4 of the image sensor (DT T4). The reason for this is to prevent deterioration in the reliability of wire bonding between the image sensor 810 and the printed circuit board 800 due to an increase in the height difference between the upper surface of the image sensor 810 and the upper surface of the printed circuit board 800 in the optical-axis direction.

However, in another embodiment, DT may be greater than T4 (DT>T4) depending on the thickness of the image sensor 810 and the thickness of the printed circuit board 800.

In the embodiment, in order to prevent deterioration in the reliability of wire bonding between the printed circuit board 800 and the image sensor 810, which have different thicknesses from each other, the camera module according to the embodiment may include the stiffener 900, 900-1 or 900-2 of FIG. 3, 4A or 4B or the stiffener 900-3 of FIG. 6.

For example, when the thickness T4 of the image sensor 810 is greater than the thickness T3 of the printed circuit board 800 (T4>T3), the embodiment includes the stiffener 900-3 of FIG. 6 so as to reduce the height difference DP between these two components in the optical-axis direction, thereby preventing deterioration in the reliability of wire bonding.

On the other hand, as shown in FIG. 3, when the thickness T4 of the image sensor 810 is less than the thickness T3 of the printed circuit board 800 (T4<T3), the embodiment may include the stiffener 900, 900-1 or 900-2 of FIG. 3, 4A or 4B so as to reduce the height difference between these two components in the optical-axis direction, thereby preventing deterioration in the reliability of wire bonding.

FIGS. 7A to 7D show a method of forming the stiffener 900-3 of FIG. 6.

Figure 7A:
FIGS. 7A to 7E show a method of forming the stiffener of FIG. 6.

Referring to FIG. 7A, a reinforced plate member 90 for forming the stiffener is prepared.

Figure 7B:
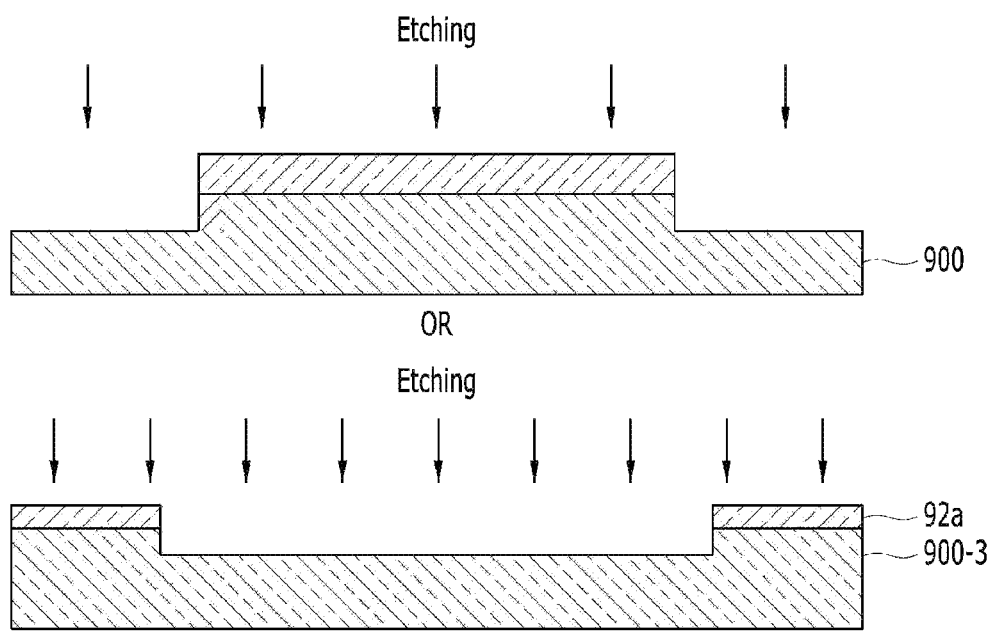

As shown in FIG. 7B, a first mask 92 or a second mask 92a is formed on the reinforced plate member 90. For example, the first mask 92 may be formed on the first region S1, in which the image sensor 810 is to be disposed, and the second mask 92a may be formed on the second region S2, in which the printed circuit board 800 is to be disposed.

Subsequently, the reinforced plate member 90 is etched using the first mask 92 or the second mask 92a as an etching mask to form the stiffener 900 of FIG. 3 or the stiffener 900-3 of FIG. 6. The stiffener 900-1 or 900-2 of FIG. 4A or 4B may be formed depending on the shape of the pattern of the first mask 92 and the second mask 92a.

After the stiffener 900 or 900-3 is formed, the first mask 92 or the second mask 92a is removed.

Figure 7C:
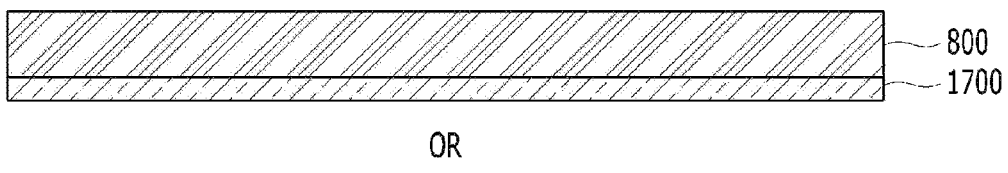

Subsequently, as shown in FIG. 7C, an adhesive member 1700 is attached to the lower surface of the printed circuit board 800. For example, the adhesive member 1700 may be attached to the entire area of the lower surface of the printed circuit board 800.

For example, the ratio of the area of the lower surface of the printed circuit board 800 to the area of the adhesive member 1700 attached to the lower surface of the printed circuit board 800 may be 1:1.

In FIG. 7C, the thickness of the printed circuit board 800 is expressed differently according to the embodiment 900 or 900-3 of the stiffener.

Figure 7D:
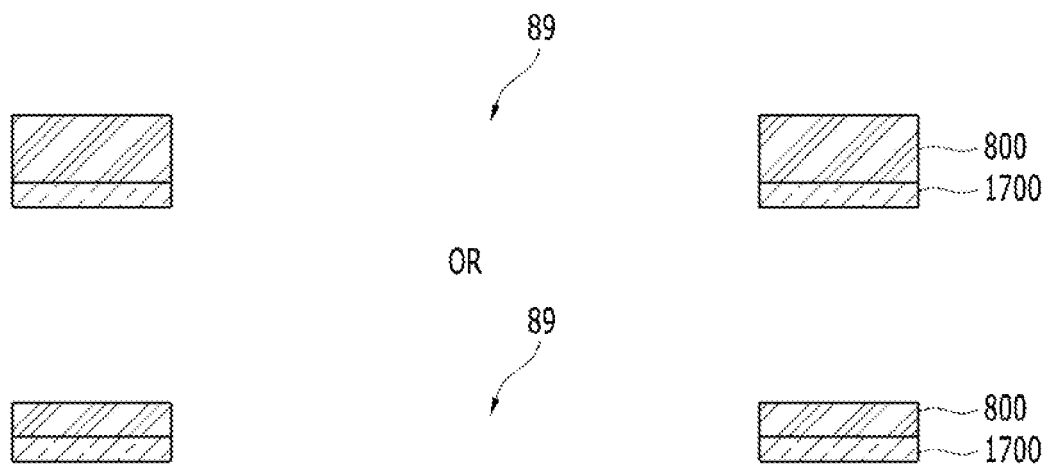

Subsequently, as shown in FIG. 7D, an opening 89 is formed so as to penetrate the printed circuit board 800 and the adhesive member 1700 by selectively etching the printed circuit board 800 and the adhesive member 1700 using a mask (not shown) on the printed circuit board 800 to which the adhesive member 1700 has been attached.

Figure 7E:
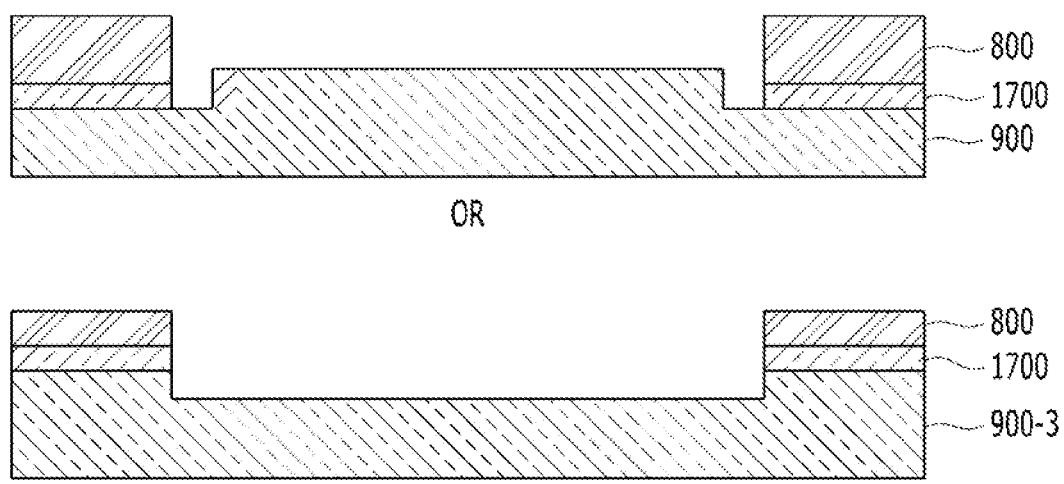

Subsequently, as shown in FIG. 7E, the adhesive member 1700 fixed to the printed circuit board 800 of FIG. 7D is attached to the second region of the stiffener 900 or 900-3.

As shown in FIGS. 7C and 7D, since the opening 89 is formed through etching after the adhesive member 1700 is attached to the printed circuit board 800, the edge of the adhesive member 1700 may extend to the opening 801 in the printed circuit board 800, thereby preventing deterioration in the reliability of wire bonding when wire bonding is performed between the image sensor and the printed circuit board.

In another embodiment, unlike the processing of FIGS. 7C and 7D, an adhesive member may be formed in the second region of the stiffener of FIG. 7B, and a printed circuit board having therein an opening may be attached to the adhesive member disposed in the second region of the stiffener.

Figure 8:
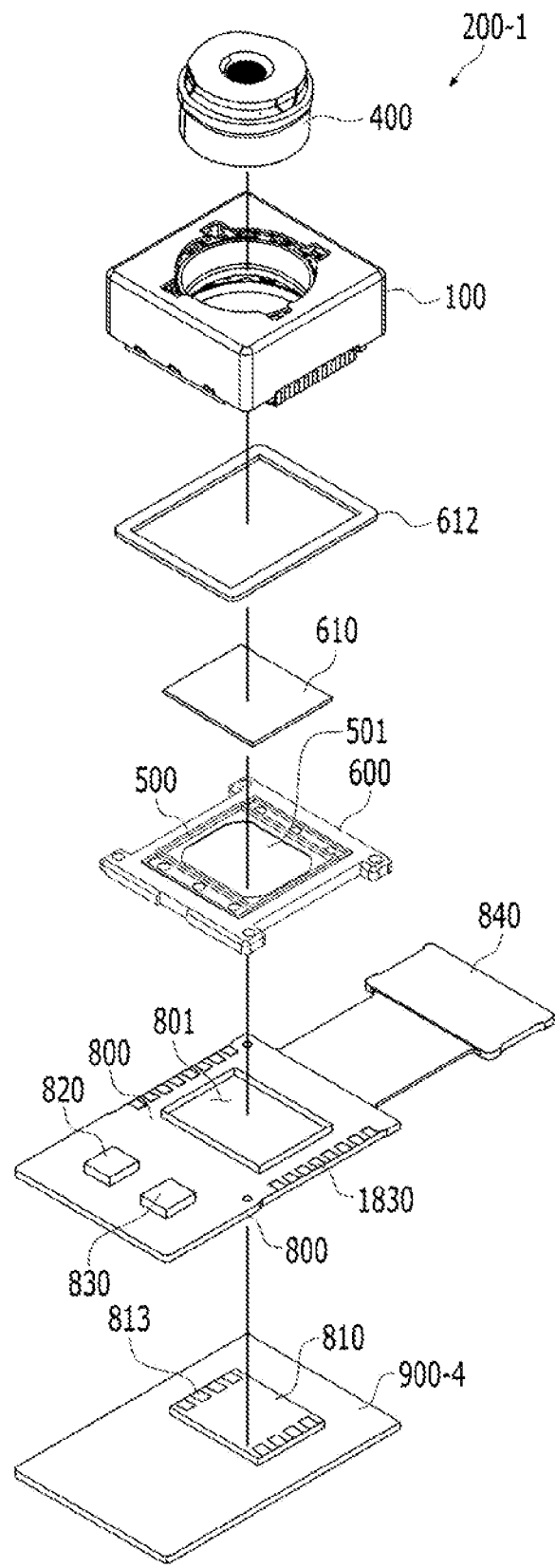
FIG. 8 is an exploded perspective view of a camera module according to another embodiment.
Figure 9:
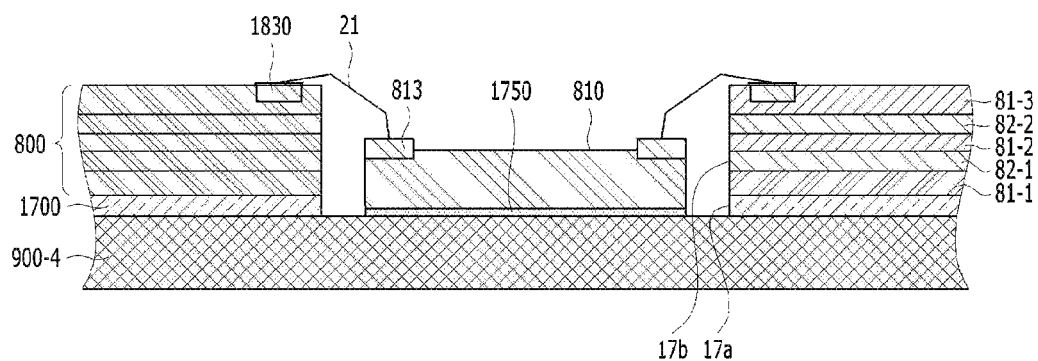
FIG. 9 is a cross-sectional view of the stiffener, the image sensor, and the printed circuit board of FIG. 8.

FIG. 8 is an exploded perspective view of a camera module 200-1 according to another embodiment, and FIG. 9 is a cross-sectional view of the stiffener 900-4, the image sensor 810, and the printed circuit board 800 of FIG. 8. The same reference numerals as those in FIG. 1 denote the same components, and a description of the same components will be omitted or made briefly.

Referring to FIGS. 8 and 9, the stiffener 900-4 includes a first region S1 and a second region S2, and the protruding portion 901 of FIG. 3 or the cavity 905 is not formed in the first region S1 of the stiffener 900-4. For example, the first region S1 of the stiffener 900-4 may be a flat surface.

The printed circuit board 800 is attached to the second region S2 of the stiffener 900-4 using an adhesive member 1700. An opening 89 may be formed so as to penetrate the printed circuit board 800 and the adhesive member 1700 to expose the first region S1 of the stiffener 900-4.

The printed circuit board 800 may have a structure in which a first insulating layer 81-1, a first conductive layer 82-1, a second insulating layer 81-2, a second conductive layer 82-2, and a third insulating layer 81-3 are sequentially stacked.

The printed circuit board 800 may include at least one terminal 1830, which is disposed on the third insulating layer 81-3 and is electrically connected to at least one of the first conductive layer 82-1 or the second conductive layer.

The inner surface 17a of the adhesive member 1700 may extend to the inner surface 17b of the opening 801 in the printed circuit board 800.

For example, the inner surface 17a of the adhesive member 1700 and the inner surface 17b of the opening 801 in the printed circuit board 800 may be positioned in the same plane in the optical-axis direction.

The adhesive member 1750 disposed in the first region S1 may be spaced apart from the adhesive member 1700 disposed in the second region S2. For example, the adhesive member 1750 and the adhesive member 1700 may have different thicknesses from each other, or may be formed through different processes from each other.

The image sensor 810 is disposed on the first region S1 of the stiffener 900-4, which is exposed through the opening 801, and is attached to the first region S1 using the adhesive member 1750.

The image sensor 810 may include a terminal 813, which is electrically connected to the terminal 1830 of the printed circuit board 800 via a wire 21.

FIGS. 10A to 10D show a process of coupling the stiffener 900-4, the image sensor 810, the printed circuit board 800, and the adhesive member 1700 shown in FIG. 9.

Figure 10A:
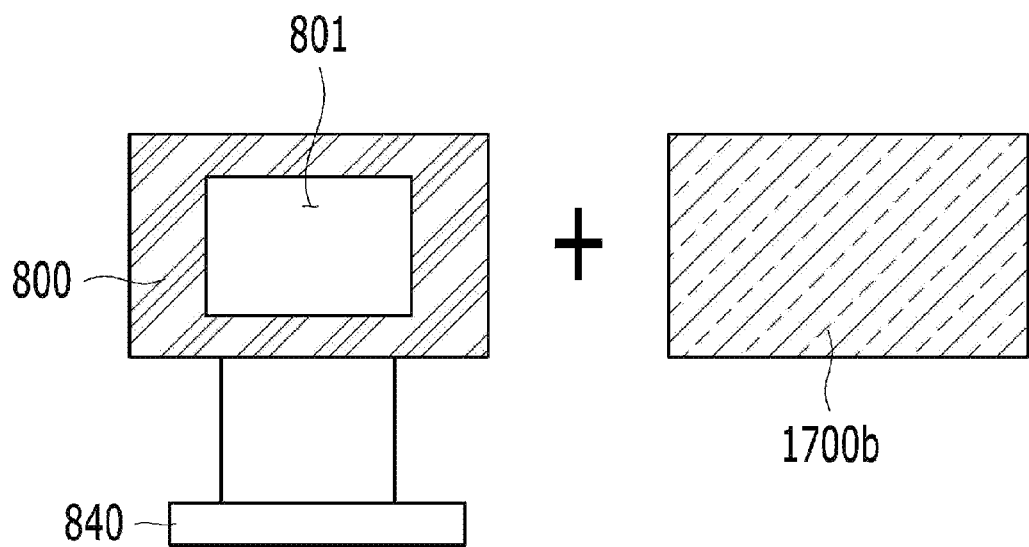
FIGS. 10A to 10D show a process of coupling the stiffener, the image sensor, the printed circuit board, and the adhesive member shown in FIG. 9.
Figure 10B:
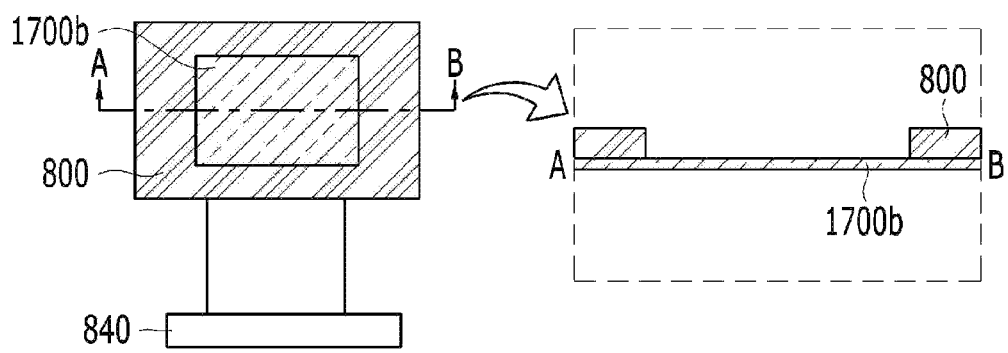

Referring to FIGS. 10A and 10B, a printed circuit board 800 having therein an opening 801 to expose the image sensor 810 and an adhesive member 1700b having a size corresponding to the size of the printed circuit board 800 are prepared. Here, the opening 801 may be a through-hole penetrating the printed circuit board 800.

For example, the area of the printed circuit board 800 defined by the horizontal length and the vertical length thereof may be the same as the area of the adhesive member 1700 defined by the horizontal length and the vertical length thereof.

Subsequently, the adhesive member 1700b is attached to the lower surface of the printed circuit board 800 having therein the opening 801. A portion of the adhesive member 1700b attached to the lower surface of the printed circuit board 800 may be exposed through the opening 801 in the printed circuit board 800. For example, the area of the adhesive member 1700b exposed through the opening 801 may be the same as the area of the opening 801.

Subsequently, referring to FIG. 10C, the region 1700a of the adhesive member 1700b that is exposed through the opening 801 is removed through an etching process using a mask to form an adhesive member 1700 having therein an opening, and the mask is removed.

Figure 10C:
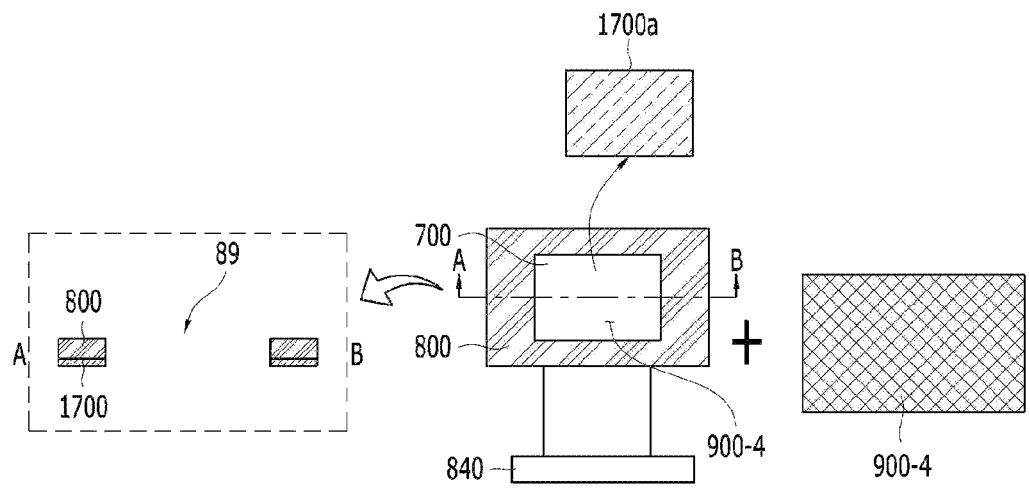

An opening 89 may be formed so as to penetrate the printed circuit board 800 and the adhesive member 1700 through the processing of FIG. 10C.

Figure 10D:
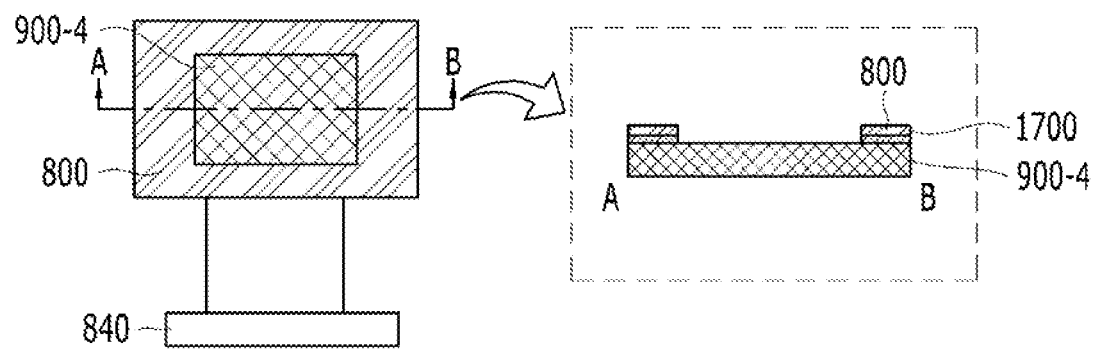

Subsequently, referring to FIG. 10D, the adhesive member 1700 is attached to the stiffener 900-4. The first region S1 of the stiffener 900-4 may be exposed through the opening 89.

Subsequently, the image sensor 810 is disposed or mounted in the first region S1 of the stiffener 900-4. The image sensor 810 may be attached to the first region S1 of the stiffener 900-4 using the adhesive member 1750. Subsequently, a wire connecting the terminal of the printed circuit board 800 to the terminal of the image sensor 810 is formed through a wire-bonding process.

Since the opening 89 is formed through an etching process after the adhesive member 1700 is bonded to the printed circuit board 800 and since the printed circuit board 800 and the adhesive member 1700, which have therein the opening 89 and are coupled to each other, are simultaneously attached to the stiffener 900-4, the embodiment is capable of preventing the generation of an unfilled region between the lower surface of the printed circuit board 800 and the second region S2 of the stiffener 900-4, in which the adhesive member 1700 is not charged.

In general, when the printed circuit board and the stiffener are attached to each other using an adhesive, pressure is applied to the adhesive. Due to this pressure, the adhesive may overflow out of the bonding surface between the stiffener and the printed circuit board, whereby the bonding force between these two components may be reduced, or the image sensor may be contaminated.

In order to prevent overflow of the adhesive and to secure the attachment tolerance of the adhesive, the adhesive is attached to the printed circuit board so as to be spaced inwards apart from the inner surface of the opening in the printed circuit board by 200 [μm] to 300 [μm]. However, in the case in which the adhesive is attached to the printed circuit board so as to be spaced inwards apart from the inner surface of the opening in the printed circuit board by 200 [μm] to 300 [μm], an unfilled region, in which the adhesive is not charged, is generated between the printed circuit board and the stiffener, which may cause warpage of the printed circuit board, and when wire bonding is performed between the warped printed circuit board and the image sensor, the reliability of wire bonding may be deteriorated.

Figure 11:
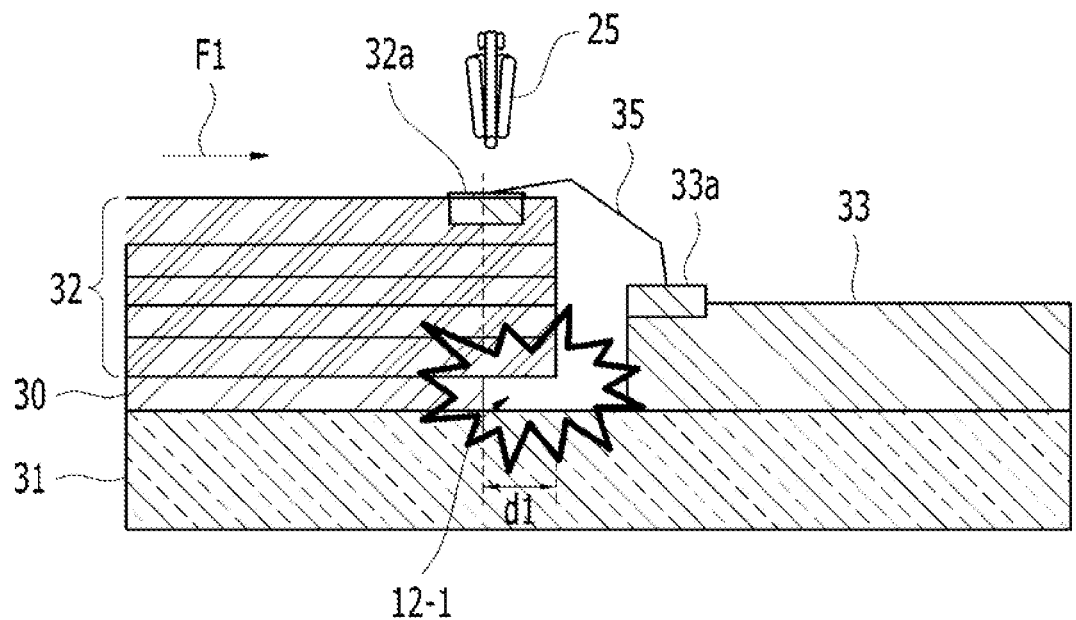
FIG. 11 shows wire bonding between a printed circuit board and an image sensor when a region in which an adhesive is not charged is present.

FIG. 11 shows wire bonding between a printed circuit board 32 and an image sensor 33 when a region 12-1 in which an adhesive is not charged is present.

Referring to FIG. 11, in the case in which the adhesive 30 is disposed so as to be spaced inwards apart from the inner surface of the opening in the printed circuit board 32 by a predetermined distance (d1=200 [μm] to 300 [μm]), a region 12-1 in which the adhesive 30 is not charged may be formed between the printed circuit board 32 and the stiffener 31, and the printed circuit board 30 may be warped due to the presence of the region 12-1 in which the adhesive 30 is not charged.

In the case of forming a wire 35 connecting a terminal 32a provided at a warped portion of the printed circuit board to a terminal 33a of the image sensor 33 using a wire-bonding apparatus 25, wire bouncing may occur, and the reliability of wire bonding may be deteriorated.

Figure 12:
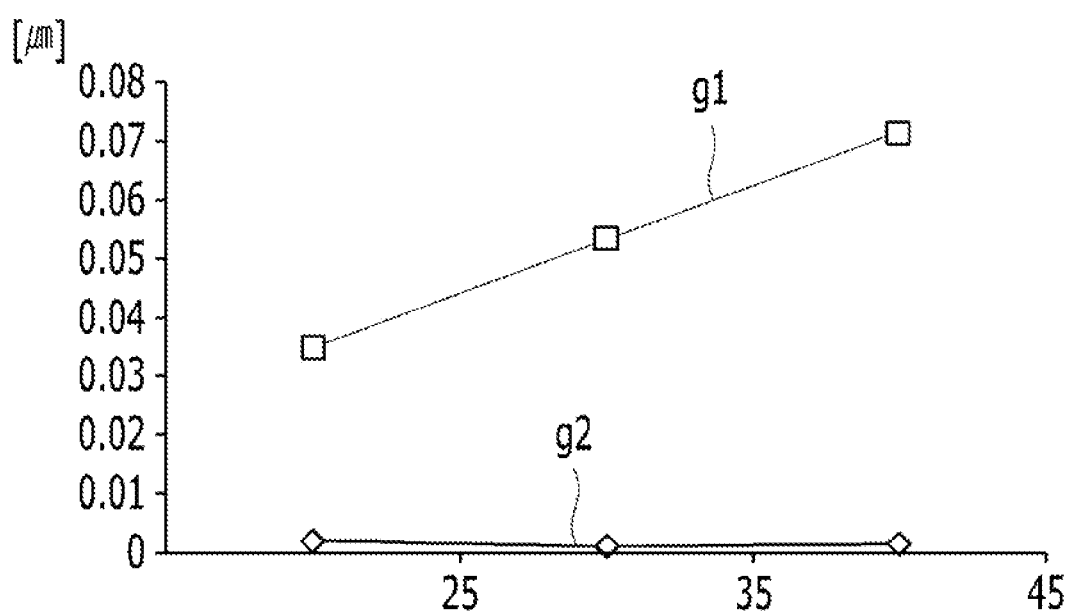
FIG. 12 shows simulation results associated with a height difference caused by warpage of the printed circuit board shown in FIG. 11, which occurs due to force applied thereto during wire bonding, and a height difference caused by warpage of the printed circuit board of FIG. 9, which occurs due to force applied thereto during wire bonding.

FIG. 12 shows simulation results pertaining to a height difference caused by warpage of the printed circuit board 32 shown in FIG. 11, which occurs due to the force applied thereto during wire bonding, and the height difference caused by warpage of the printed circuit board 800 according to the embodiment of FIG. 9, which occurs due to the force applied thereto during wire bonding.

Here, the height difference in FIG. 12 may be the height difference from one end of the printed circuit board 32 to the opposite end thereof, which is indicated by F1. For example, the height difference in FIG. 12 may be the height difference between the highest point of the printed circuit board and the lowest point thereof. The X-axis represents the force applied to the printed circuit board 32 or 800 by the wire-bonding apparatus, and the unit of force may be [g·cm/s^2]. The Y-axis represents the height difference, and the unit thereof may be micrometers.

g1 represents the height difference caused by warpage of the printed circuit board 32, and g2 represents the height difference caused by warpage of the printed circuit board 800.

Referring to FIG. 12, as the force applied to the printed circuit board 32 increases, the height difference g1 increases, but even when the force applied to the printed circuit board 800 increases, the height difference g2 may be constant.

According to the simulation results of FIG. 12, in the embodiment, the printed circuit board 800 is warped insignificantly during wire bonding, and thus the height difference is constant, thereby securing reliability of wire bonding between the printed circuit board 800 and the image sensor 810.

Figure 13:
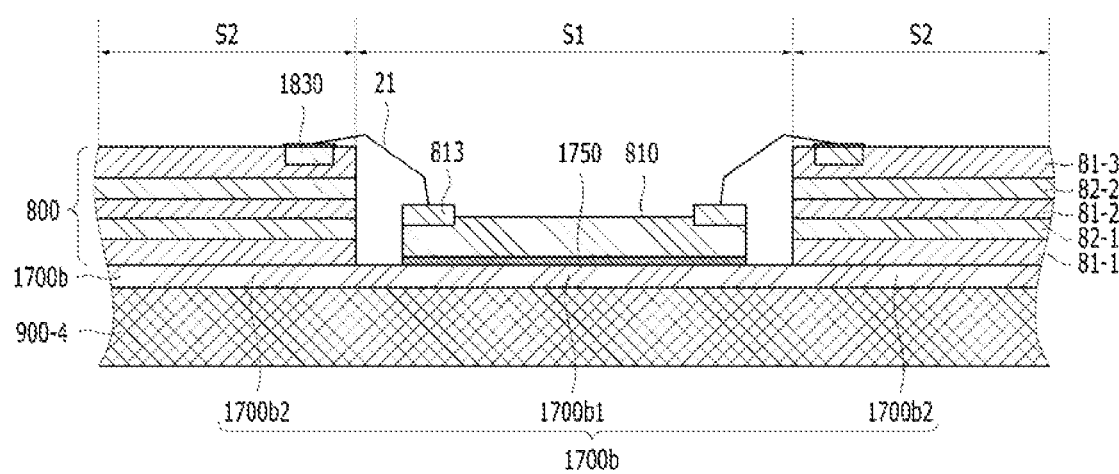
FIG. 13 is a cross-sectional view of other embodiments of the stiffener, the image sensor, and the printed circuit board of FIG. 8.

FIG. 13 is a cross-sectional view of other embodiments of the stiffener 900-4, the image sensor 810, and the printed circuit board 800 of FIG. 8. The same reference numerals as those in FIG. 8 denote the same components, and a description of the same components will be omitted or made briefly.

Referring to FIG. 13, the printed circuit board 800 and the image sensor 810 may be attached to the stiffener 900-4 using one adhesive member 1700b.

That is, the adhesive member 1700b may include a first adhesive member 1700b1 disposed in a first region S1 of the stiffener 900-4 and a second adhesive member 1700b2 disposed in a second region S2 of the stiffener 900-4 and connected to or contiguous with the first adhesive member 1700b1.

For example, the first adhesive member 1700b1 may be in contact with the opening 801 in the printed circuit board 800 along the inner surface of the opening 801 in the printed circuit board 800.

For example, the adhesive member 1700b may cover the entire area of the first region S1 of the stiffener 900-4.

For example, the upper surface of the first adhesive member 1700b1 and the upper surface of the second adhesive member 1700b2 may be positioned in the same plane.

Figure 14A:
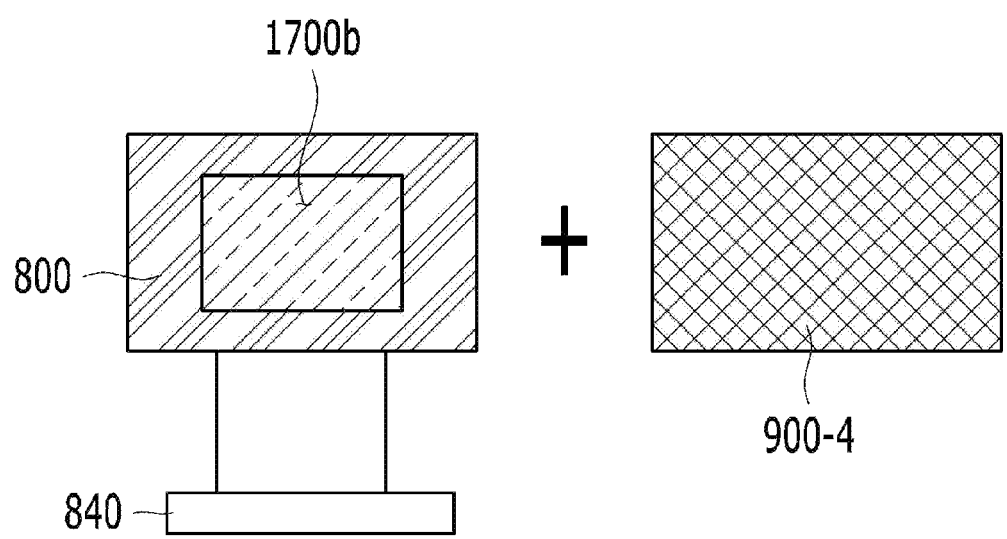
FIGS. 14A and 14B show a process of coupling the stiffener, the image sensor, the printed circuit board, and the adhesive member shown in FIG. 13.
Figure 14B:
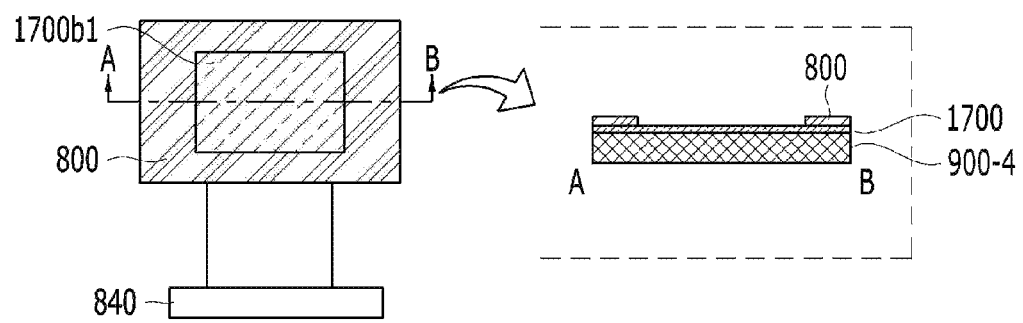

FIGS. 14A and 14B show a process of coupling the stiffener 900-4, the image sensor 810, the printed circuit board 800, and the adhesive member 1700b shown in FIG. 13.

First, as described with reference to FIGS. 10A and 10B, the adhesive member 1700b is attached to the lower surface of the printed circuit board 800 having therein the opening 801.

Subsequently, as shown in FIGS. 14A and 14B, the adhesive member 1700b is attached to the upper surface of the stiffener 900-4. For example, the adhesive member 1700b may cover both the first region S1 and the second region S2 of the stiffener 900-4.

For example, the adhesive member 1700b may include a first adhesive member 1700b1 covering the entire area of the first region S1 of the stiffener 900-4 and a second adhesive member 1700b2 covering the entire area of the second region S2 of the stiffener 900-4. The first adhesive member 1700b1 may be exposed through the opening 801 in the printed circuit board 800.

Subsequently, the image sensor 810 is disposed or mounted on the first adhesive member 1700b1, exposed through the opening 801 in the printed circuit board 800.

Subsequently, a wire connecting the terminal of the printed circuit board 800 to the terminal of the image sensor 810 is formed through a wire-bonding process.

In the case of FIGS. 14A and 14B, since the adhesive member 1700b is formed and continuously maintained over the entire area of the first region S1 and the entire area of the second region S2 of the stiffener 900-4, a gap or a region, in which the adhesive is not charged, is not present between the lower surface of the printed circuit board 800 and the upper surface of the stiffener 900-4 or between the lower surface of the image sensor 810 and the upper surface of the stiffener. Accordingly, when wire bonding is performed between the image sensor and the printed circuit board, wire bouncing does not occur, and thus the reliability of wire bonding is secured.

The camera module 200 according to the embodiment may include a printed circuit board 800 having therein an opening 801 to allow the image sensor 810 to be disposed therein in order to reduce the height of the camera module 200.

In addition, the camera module 200 according to the embodiment may include a stiffener 900, which supports the printed circuit board 800 and on which the image sensor 810 is mounted in order to dissipate the heat generated from the image sensor 810.

The height of the camera module is proportional to the thickness of the stiffener. In the case of reducing the thickness of the stiffener in order to reduce the height of the camera module, the flatness of the stiffener 900, on which the image sensor is mounted, may be deteriorated, and the optical performance of the camera module may be deteriorated.

As shown in FIG. 3, the embodiment includes the stiffener 900 having the protruding portion 901, on which the image sensor 810 is mounted, thereby improving the flatness of the stiffener 900, thus improving the optical performance of the camera module.

In addition, the embodiment selectively adopts the shape of the stiffener of the embodiment of FIG. 3 or the shape of the stiffener of the embodiment of FIG. 6 depending on the thickness of the image sensor and the thickness of the printed circuit board, thereby reducing the height difference between the image sensor 810 and the printed circuit board 800 in the optical-axis direction, thus securing reliability of wire bonding.

In addition, as shown in FIGS. 4A and 4B, in the embodiment, an uneven portion is formed on the protruding portion 901 of the stiffener 900, on which the image sensor is mounted, thereby increasing the bonding force between the stiffener and the image sensor and preventing deterioration in the bonding force and contamination of the image sensor due to overflow of the adhesive.

In addition, in the embodiment, the printed circuit board 800, the stiffener 900, the image sensor 810, and the adhesive member 1700 or 1700b are coupled through the method of FIGS. 7A to 7E, FIGS. 10A to 10D, or FIGS. 14A and 14B. Thus, upon wire bonding for electrically connecting the printed circuit board 800 to the image sensor 810, it is possible to suppress warpage of the printed circuit board 800 and thus to secure reliability of wire bonding.

The camera module according to the embodiment may be included in an optical instrument for the purpose of forming an image of an object present in a space using reflection, refraction, absorption, interference, and diffraction, which are characteristics of light, for the purpose of increasing visibility, for the purpose of recording and reproduction of an image by a lens, or for the purpose of optical measurement or image propagation or transmission. For example, the optical instrument according to the embodiment may include a smartphone and a portable terminal equipped with a camera.

Figure 15:
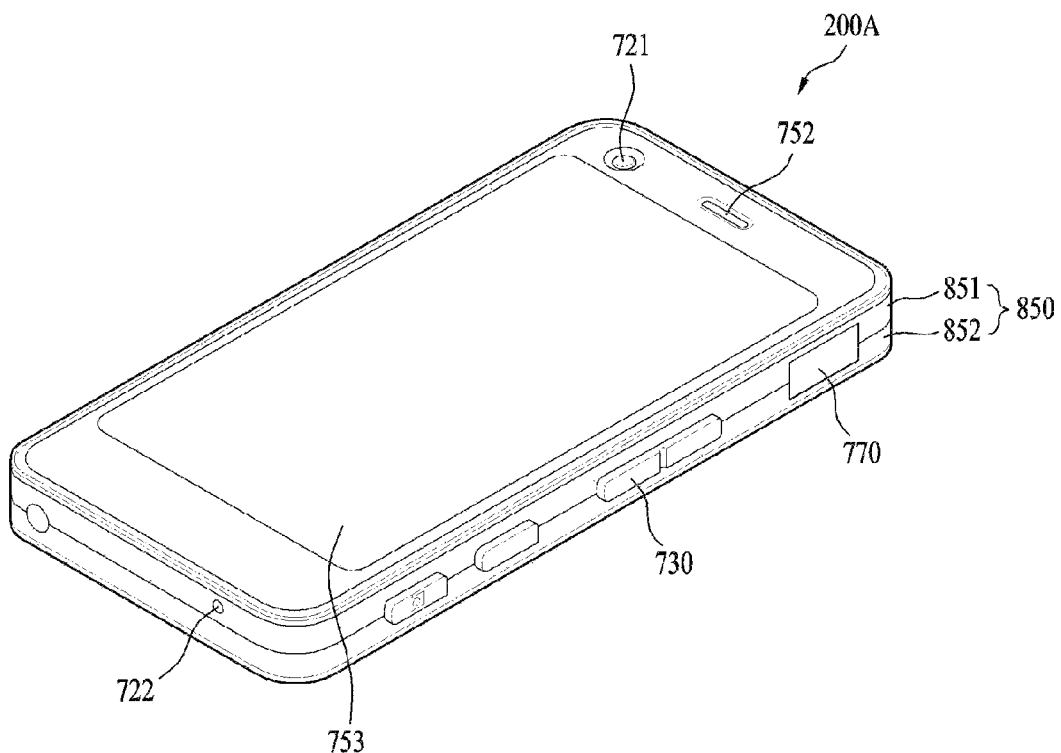
FIG. 15 is a perspective view of a portable terminal according to an embodiment.
Figure 16:
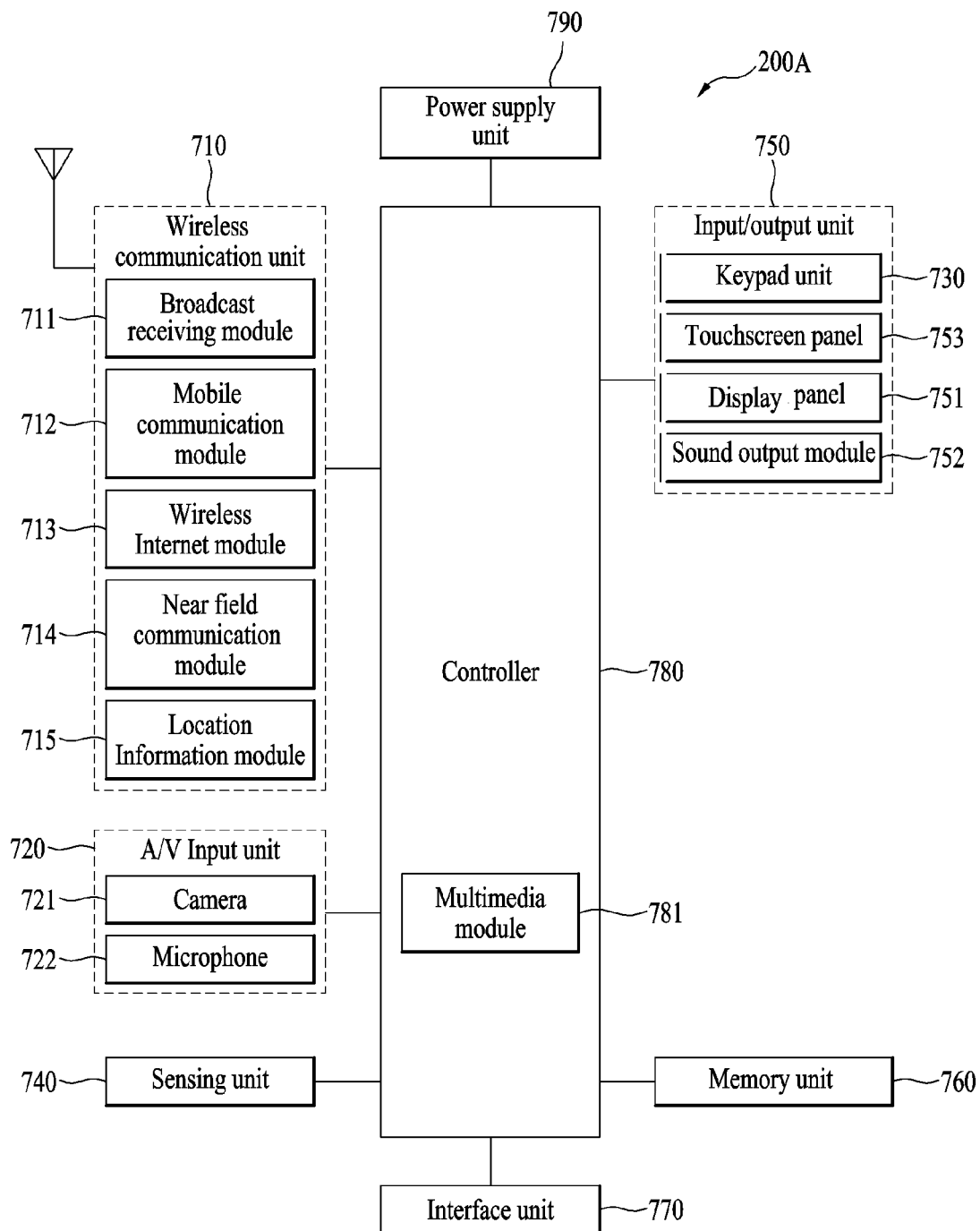
FIG. 16 is a configuration diagram of the portable terminal shown in FIG. 14.

FIG. 15 is a perspective view of a portable terminal 200A according to an embodiment, and FIG. 16 is a configuration diagram of the portable terminal 200A shown in FIG. 15.

Referring to FIGS. 15 and 16, the portable terminal 200A (hereinafter referred to as a "terminal") may include a body 850, a wireless communication unit 710, an A/V input unit 720, a sensor 740, an input/output unit 750, a memory 760, an interface 770, a controller 780, and a power supply 790.

The body 850 shown in FIG. 15 has a bar shape, without being limited thereto, and may be any of various types such as, for example, a slide type, a folder type, a swing type, or a swivel type, in which two or more sub-bodies are coupled so as to be movable relative to each other.

The body 850 may include a case (e.g. casing, housing, or cover) defining the external appearance thereof. For example, the body 850 may be divided into a front case 851 and a rear case 852. A variety of electronic components of the terminal may be mounted in the space formed between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast receiving module 711, a mobile communication module 712, a wireless Internet module 713, a nearfield communication module 714, and a location information module 715.

The audio/video (A/V) input unit 720 serves to input audio signals or video signals, and may include a camera 721 and a microphone 722.

The camera 721 may include the camera module 200 or 200-1 according to the embodiment shown in FIG. 1 or 8.

The sensor 740 may sense the current state of the terminal 200A, such as the open or closed state of the terminal 200A, the location of the terminal 200A, the presence or absence of a user's touch, the orientation of the terminal 200A, or the acceleration/deceleration of the terminal 200A, and may generate a sensing signal to control the operation of the terminal 200A. For example, when the terminal 200A is a slide-type phone, whether the slide-type phone is open or closed may be detected. In addition, the sensor 740 serves to sense whether power is supplied from the power supply 790 or whether the interface 770 is coupled to an external device.

The input/output unit 750 serves to generate visual, audible, or tactile input or output. The input/output unit 750 may generate input data to control the operation of the terminal 200A, and may display information processed in the terminal 200A.

The input/output unit 750 may include a keypad unit 730, a display panel 751, a sound output module 752, and a touchscreen panel 753. The keypad unit 730 may generate input data in response to input to a keypad.

The display panel 751 may include a plurality of pixels, the color of which varies in response to electrical signals. For example, the display panel 751 may include at least one of a liquid crystal display, a thin-film transistor liquid crystal display, an organic light-emitting diode, a flexible display, or a 3D display.

The sound output module 752 may output audio data received from the wireless communication unit 710 in a call-signal reception mode, a call mode, a recording mode, a voice recognition mode, or a broadcast reception mode, or may output audio data stored in the memory 760.

The touchscreen panel 753 may convert variation in capacitance, caused by a user's touch on a specific region of a touchscreen, into electrical input signals.

The memory 760 may store programs for the processing and control of the controller 780, and may temporarily store input/output data (e.g. a phone book, messages, audio, still images, pictures, and moving images). For example, the memory 760 may store images captured by the camera 721, for example, pictures or moving images.

The interface 770 serves as a passage for connection between the terminal 200A and an external device. The interface 770 may receive data or power from the external device, and may transmit the same to respective components inside the terminal 200A, or may transmit data inside the terminal 200A to the external device. For example, the interface 770 may include a wired/wireless headset port, an external charger port, a wired/wireless data port, a memory card port, a port for connection of a device having an identification module, an audio input/output (I/O) port, a video input/output (I/O) port, and an earphone port.

The controller 780 may control the general operation of the terminal 200A. For example, the controller 780 may perform control and processing related to voice calls, data communication, and video calls.

The controller 780 may include a multimedia module 781 for multimedia playback. The multimedia module 781 may be provided inside the controller 180, or may be provided separately from the controller 780.

The controller 780 may perform pattern recognition processing, by which writing or drawing input to the touchscreen is perceived as characters or images.

The power supply 790 may supply power required to operate the respective components upon receiving external power or internal power under the control of the controller 780.

The features, structures, effects and the like described above in the embodiments are included in at least one embodiment of the present disclosure, but are not necessarily limited to only one embodiment. Furthermore, the features, structures, effects and the like exemplified in the respective embodiments may be combined with other embodiments or modified by those skilled in the art. Therefore, content related to such combinations and modifications should be construed as falling within the scope of the present disclosure.

INDUSTRIAL APPLICABILITY

The embodiments may be used in a camera module and an optical device capable of improving optical performance, securing reliability of wire bonding between a printed circuit board and an image sensor, and increasing bonding force between a stiffener and the image sensor.

The invention claimed is:

1. A camera module, comprising:
   a stiffener comprising a protruding portion protruding from an upper surface of the stiffener;
   a printed circuit board disposed on the upper surface of the stiffener and comprising a through hole in which the protruding portion of the stiffener is disposed;
   an image sensor disposed on an upper surface of the protruding portion of the stiffener; and
   a lens barrel disposed above the image sensor,
   wherein the upper surface of the protruding portion is positioned lower than an upper surface of the printed circuit board, and
   wherein the stiffener is a one-piece member.

2. The camera module according to claim 1, comprising a first adhesive member disposed between the upper surface of the protruding portion and a lower surface of the image sensor.

3. The camera module according to claim 1, comprising:
   a holder disposed on the printed circuit board; and
   a filter disposed on the holder and opposite to the image sensor.

4. The camera module according to claim 2, wherein the stiffener comprises an uneven portion formed on an upper surface of the protruding portion.

5. The camera module according to claim 4, wherein the uneven portion comprises convex portions and concave portions.

6. The camera module according to claim 5, wherein the convex portions have a plurality of lines, a stripe shape, a net shape, a plurality of dots, or a plurality of islands.

7. The camera module according to claim 5, wherein a portion of the first adhesive member is disposed in the concave portions.

8. The camera module according to claim 1, wherein a thickness of the image sensor is less than a thickness of the printed circuit board.

9. The camera module according to claim 2, comprising a second adhesive member disposed between the stiffener and the printed circuit board.

10. The camera module according to claim 9, wherein the first adhesive member is located at a higher position than the second adhesive member.

11. The camera module according to claim 1, wherein the printed circuit board comprises a first terminal, and the image sensor comprises a second terminal, and
wherein the camera module comprises a wire connecting the first terminal to the second terminal.

12. The camera module according to claim 1, wherein the image sensor is disposed within the through hole of the printed circuit board, when viewed from a top.

13. The camera module according to claim 1, wherein the stiffener is formed of a metal material, glass epoxy, plastic, or synthetic resin.

14. The camera module according to claim 1, wherein an area of the upper surface of the protruding portion is equal to or greater than an area of a lower surface of the image sensor.

15. The camera module according to claim 1, wherein the stiffener comprises a first region and a second region,
wherein the first region is the protruding portion and the printed circuit board is coupled to the second region.

16. The camera module according to claim 12, wherein a thickness of the first region of the stiffener is greater than a thickness of the second region of the stiffener.

17. The camera module according to claim 1, wherein a side surface of the protruding portion is spaced apart from a side surface of the through hole of the printed circuit board.

18. A camera module, comprising:
a stiffener comprising a protruding portion protruding from an upper surface of the stiffener and an uneven portion formed on an upper surface of the protruding portion;
a printed circuit board disposed on the upper surface of the stiffener and comprising a through hole in which the protruding portion of the stiffener is disposed;
an image sensor disposed on the upper surface of the protruding portion of the stiffener;
a first adhesive member disposed between the uneven portion of the stiffener and a lower surface of the image sensor; and
a lens barrel disposed above the image sensor.

19. The camera module according to claim 18, wherein the uneven portion comprises convex portions and concave portions, and a portion of the first adhesive member is disposed in the concave portions.

20. A camera module, comprising:
a stiffener comprising a protruding portion protruding from an upper surface of the stiffener;
a printed circuit board disposed on the upper surface of the stiffener and comprising a through hole in which the protruding portion of the stiffener is disposed;
an image sensor disposed on an upper surface of the protruding portion of the stiffener; and
a lens barrel disposed above the image sensor,
wherein the protruding portion of the stiffener and the image sensor are disposed within the through hole of the printed circuit board, when viewed from a top, and
wherein the stiffener is a one-piece member.

* * * * *